(12) United States Patent
Miller

(10) Patent No.: US 10,315,676 B1
(45) Date of Patent: Jun. 11, 2019

(54) RACING CANOE DOLLY

(71) Applicant: Michael Anthony Miller, Bonney Lake, WA (US)

(72) Inventor: Michael Anthony Miller, Bonney Lake, WA (US)

(*) Notice: Subject to any disclaimer, the term of this patent is extended or adjusted under 35 U.S.C. 154(b) by 0 days.

(21) Appl. No.: 15/405,251

(22) Filed: Jan. 12, 2017

Related U.S. Application Data

(60) Provisional application No. 62/255,423, filed on Jan. 12, 2016.

(51) Int. Cl.
*B62B 3/00* (2006.01)
*B62B 3/10* (2006.01)

(52) U.S. Cl.
CPC ............... *B62B 3/10* (2013.01); *B62B 3/001* (2013.01); *B62B 2202/403* (2013.01); *B62B 2203/44* (2013.01)

(58) Field of Classification Search
CPC ....... B62B 3/10; B62B 3/001; B62B 2203/44; B62B 2202/403
See application file for complete search history.

(56) References Cited

U.S. PATENT DOCUMENTS

| | | | | |
|---|---|---|---|---|
| 2,472,952 A | * | 6/1949 | Lennard | B62B 5/0083 280/35 |
| 2,509,067 A | * | 5/1950 | Leach | B60P 3/1091 114/344 |
| 3,663,040 A | * | 5/1972 | Weaver | B60P 3/1091 280/414.1 |
| 3,955,830 A | * | 5/1976 | Hardwick | B60P 3/1033 280/414.3 |
| 4,029,227 A | * | 6/1977 | Martinez | B60P 3/1091 280/414.3 |
| 4,507,016 A | * | 3/1985 | Honour, VII | B63C 3/12 114/344 |
| 4,801,152 A | * | 1/1989 | Elliott | B60B 33/00 114/344 |
| 4,824,127 A | * | 4/1989 | Stamm | B63C 13/00 114/344 |
| 5,042,417 A | * | 8/1991 | Raymond | B63C 13/00 114/343 |
| 6,126,052 A | * | 10/2000 | Toivola | B60P 3/10 224/309 |
| 8,505,948 B2 | * | 8/2013 | Granlind | B60P 3/1091 114/344 |

(Continued)

*Primary Examiner* — Paul N Dickson
*Assistant Examiner* — Joselynn Y Sliteris
(74) *Attorney, Agent, or Firm* — S&L US IP Attorneys, P.C.; Timothy Marc Shropshire; Eric Brandon Lovell

(57) ABSTRACT

Disclosed is a canoe transport dolly having a main truck, a front truck, and a rod connecting the main truck to the front truck. The main truck and the front truck each have a gantry assembly comprising one or more axles in communication with one or more tires, a powerhead assembly, a plurality of threaded rods interconnecting the gantry assembly to the powerhead assembly. A plurality of arms are in rotational communication with the powerhead assembly, each arm having a hooked end extending away from the powerhead assembly. A canopy assembly positioned above the belt assembly for engaging a canoe gunwale, wherein the canopy assembly releasably engages the arms' hooked ends; and a return asset assembly in communication with the arm assembly, the return asset assembly.

7 Claims, 30 Drawing Sheets

(56) References Cited

U.S. PATENT DOCUMENTS

2007/0029747 A1\* 2/2007 Islo ................... B60F 3/0069
                                                    280/47.35
2018/0015940 A1\* 1/2018 Walkner ............... B62B 3/0631

\* cited by examiner

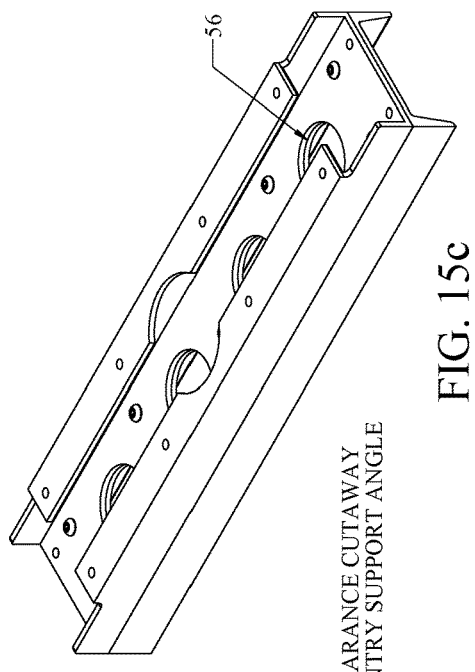
FIG. 15c
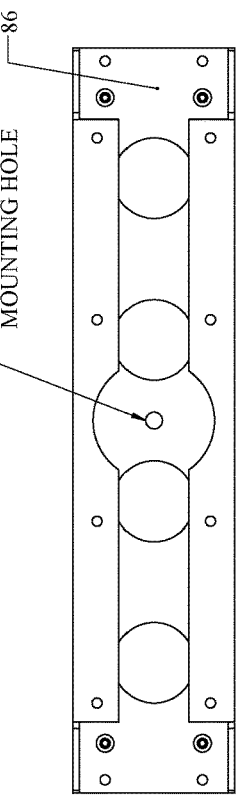
FIG. 15e
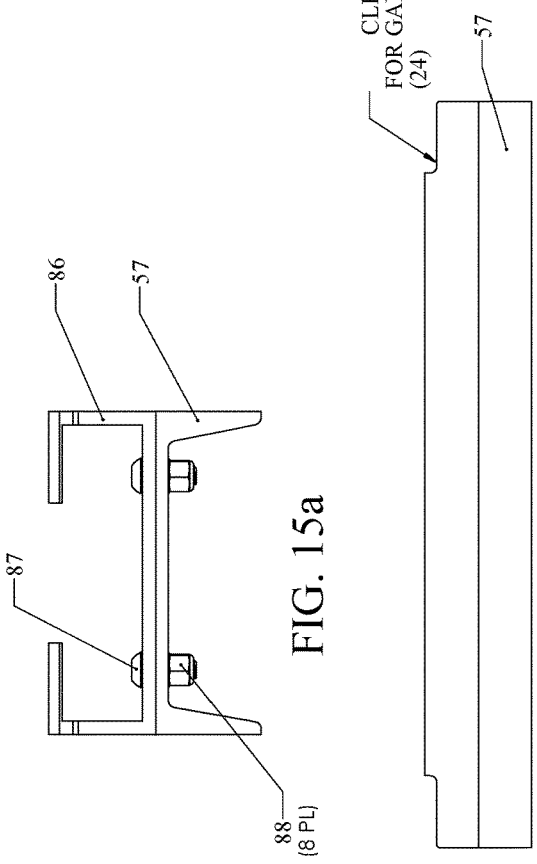
FIG. 15a
FIG. 15b
FIG. 15d
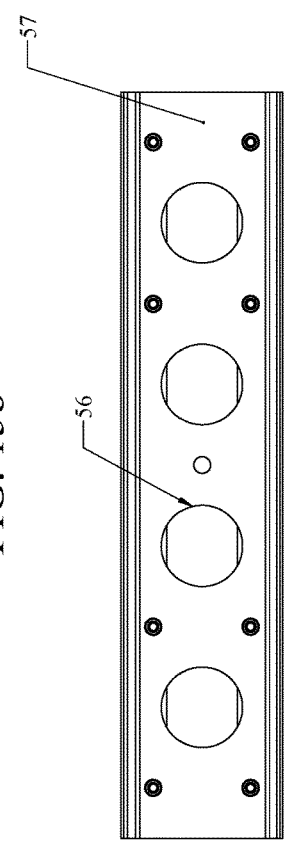

RACING CANOE DOLLY

CROSS-REFERENCE TO RELATED APPLICATION(S)

The present application claims priority to Provisional Application No. 62/255,423 filed on Jan. 12, 2016, entitled "RACING CANOE DOLLY 2" the entire disclosure of which is incorporated by reference herein.

BACKGROUND OF THE INVENTION

Field of Invention

This invention relates to watercraft transportation devices. More particularly to a dolly for facilitating canoe placement.

Description of Related Art

Launching a watercraft requires precision, coordination, strength, and the proper tools to facilitate transfer of the watercraft from land to a body of water. Typically, smaller watercraft such as canoes are not left in the water like a larger vessel. This adds to a level of complication when launching the canoe as it has to be launched and removed each time it is used.

Currently, to launch a canoe, a user is limited to having two or more people transfer the canoe by lifting it from one position to the water. It is extremely difficult to move a personal canoe due to the size and weight. When considering a racing canoe, it may require far more than two people to move it. This has lead to attempts in developing tools to facilitate the transfer. The current designs are extremely limited in their functionality and their ability to facilitate the transfer. Static carts prevent adaptable configurations to accept a range of canoe sizes or shapes.

Based on the forgoing, there is a need in the art of a transfer mechanism that will allow for a improved easy of use while expanding the possibility and functionality of transporting watercraft to and from a body of water.

SUMMARY OF THE INVENTION

In an embodiment, a canoe transport dolly comprises a main truck; a front truck; and a rod connecting the main truck to the front truck, the main truck and the front truck each comprising: a gantry assembly comprising one or more axles in communication with one or more tires; a powerhead assembly; a plurality of threaded rods interconnecting the gantry assembly to the powerhead assembly; a belt assembly comprising: a belt wrapped around a series of rollers for receiving a canoe hull, wherein the belt assembly is positioned above, and connected to, the powerhead assembly; a plurality of arms in rotational communication with the powerhead assembly, each arm having a hooked end extending away from the powerhead assembly; a canopy assembly positioned above the belt assembly for engaging a canoe gunwale, wherein the canopy assembly releasably engages the arms' hooked ends; and a return asset assembly in communication with the arm assembly, the return asset assembly comprising: a plurality of cams, each cam corresponding to one of the plurality of arms; and a plurality of cables, wherein a first end of each cable connects to a corresponding cam, and wherein a second end of each cable connects to the hooked end of the corresponding arm, wherein rotation of each cam causes the corresponding arm's hooked end to rotate downward, driving the canoe deeper into the belt.

In another embodiment, the main truck further comprises a right side suspension assembly; and a left side suspension assembly, the right side suspension assembly and the left side suspension assembly each comprising: a suspension arm having a first end connected to a forward gantry assembly axle, and a second end comprising an axle connected to the one or more tires; a torsion arm; and a coil-over spring, wherein the coil-over spring is in communication with a first end of a rearward gantry assembly axle, and wherein a first end of the torsion arm is connected to a second end of the rearward gantry assembly axle, wherein a second end of the torsion arm slidingly engages a groove within a corresponding suspension arm to activate the coil-over spring.

In another embodiment, the front truck gantry assembly comprises a single axle having a tandem set of tires positioned underneath the front truck gantry assembly, wherein the front truck is steerable.

In another embodiment, the canoe transport dolly further comprising a gas spring assembly having a center gas spring having a first end connected to the gantry assembly and a second end connected to the powerhead; and four auxiliary springs, each having a first end connected to the gantry assembly and a second end comprising rod end mounts that slidingly engage slots in the powerhead assembly.

In another embodiment, the canoe transport dolly further comprises: a right side belt tensioning assembly comprising two tensioning springs, each having a first end mounted on a right side of the powerhead and a second end attached to the ends of an upper righthand roller of the belt assembly; and a left side belt tensioning assembly comprising two tensioning springs, each having a first end mounted on a left side of the powerhead and a second end attached to the ends of an upper lefthand roller of the belt assembly, wherein the tensioning springs of the right side belt tensioning assembly and the left side belt tensioning assembly are mounted at diagonally opposing angles to a respective side of the belt assembly.

In another embodiment, the canopy assembly further comprises neoprene rubber foot pads positioned at each canoe contact point.

In another embodiment, the gantry assembly comprises an upper level and a lower level, wherein the threaded rods are connected to the lower level and pass through the upper level to the powerhead In an embodiment, a device that would effectively and easily be transported to and from from the hālau (boathouse or parking lot) to the shoreline and then down into the water and underneath the hull to be positioned.

In another embodiment, a device that would automatically yet aggressively attach to the underside of the hull (with manual trigger and safety release) so as to not apply any "point load" on the hull or chafing to cause damage. This attachment temporarily "marries" the hull and provides 90 degree rotational transport up the beach effortlessly with the added ability of rotational steering.

In another embodiment, a device that can operate in a dual-purpose manner; either as a transport assembly to move the boat, or as a "moored docking pedestal" tethered in the surf for crew rotation without having to portage to the hālau (boathouse) and back again each time. This has never been done before and would be an extremely welcome addition to the entire racing community.

In another embodiment, a device that is as easily operated by 6 grown adults as well as by 6 high school aged team members. These Clubs offer training and racing classes for people of all ages from 12 to 60+. Responsibility, knowledge, maintenance, team cooperation and persistence are disciplines that team members are taught and also follow diligently in these Clubs.

In another embodiment, a device that does not corrode in salt water; or at least corrosion resistance engineered. As per ritual, these mechanisms (as well as all the other equipment) are rinsed off thoroughly with fresh water daily. Each crew is responsible to do this every time they use the facility. Daily rinse with fresh water is crucial to the longevity of the unit.

In another embodiment, a device that allows for the horizontal offload of it's vessel onto an awaiting trailer or shelf or other storage area without undue effort.

In another embodiment, a device that is adjustable to fit certain profiles of outrigger canoes. Due to the varied geometry of these vessels, fitting to the OC-6 category would give the Club the most utility. This device is designed to accommodate both practice and racing profiles of the 6-man "OC-6".

In another embodiment, a device that is rugged and extremely powerful yet gentle on the hull and will not fall off or break under normal use, and will support the manual physical forces placed upon it by 6 individuals to power the outrigger through the surf, pushing against it at waist height, up onto dry sand and further up the beach head to the hālau without breaking or failing. This process is repeated many times a day, 360 days a year.

In another embodiment, a device that; when not in use, can be stowed in a relatively small enough area as to not take up more than realistic nor desirable space in the hālau/boathouse.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 15a shows a side elevational view of a main spine assembly of the racing canoe dolly, according to an embodiment of the present invention;

FIG. 15b shows a front elevational view of a main spine assembly of the racing canoe dolly, according to an embodiment of the present invention;

FIG. 15c shows a perspective view of a main spine assembly of the racing canoe dolly, according to an embodiment of the present invention;

FIG. 15d shows a bottom plan view of a main spine assembly of the racing canoe dolly, according to an embodiment of the present invention;

FIG. 15e shows a top plan view of a main spine assembly of the racing canoe dolly, according to an embodiment of the present invention;

DETAILED DESCRIPTION OF PREFERRED EMBODIMENTS

Figure 1A:
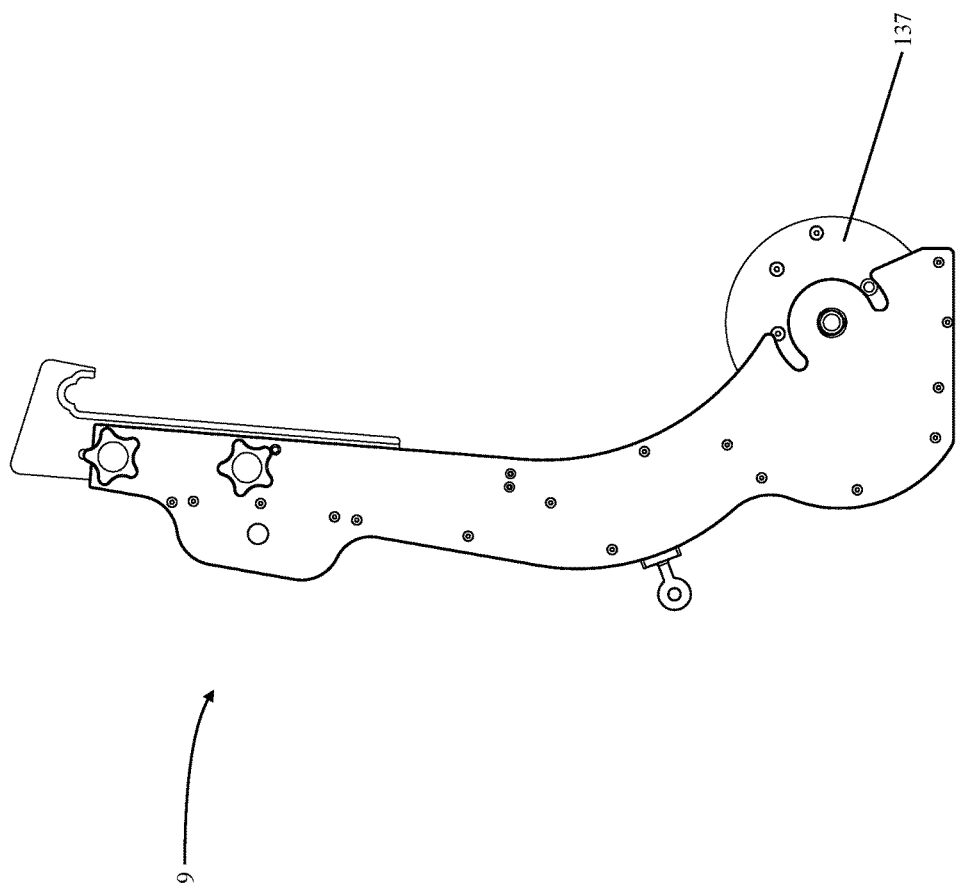
FIG. 1a shows a front elevational view of an arm assembly of the racing canoe dolly, according to an embodiment of the present invention.
Figure 1B:
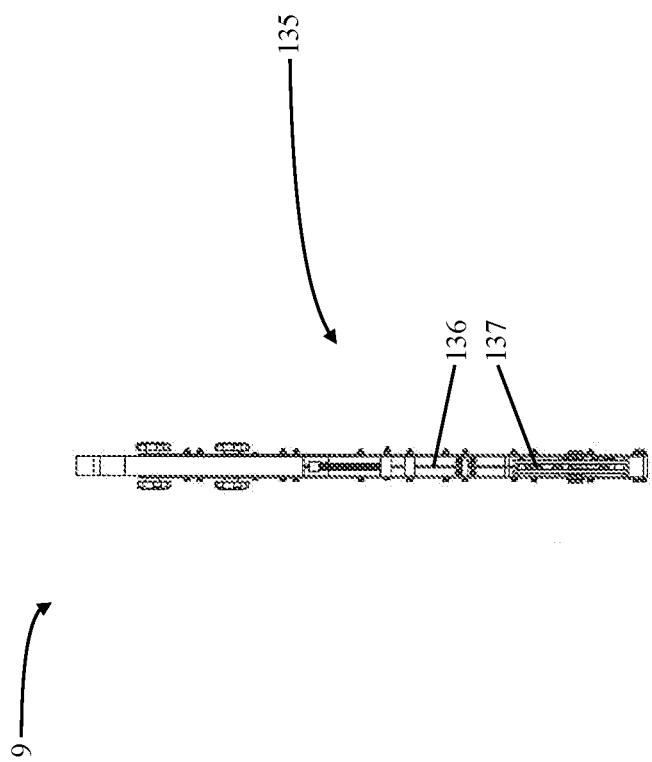
FIG. 1b shows a side elevational view of the arm assembly of the racing canoe dolly, according to an embodiment of the present invention.
Figure 2:
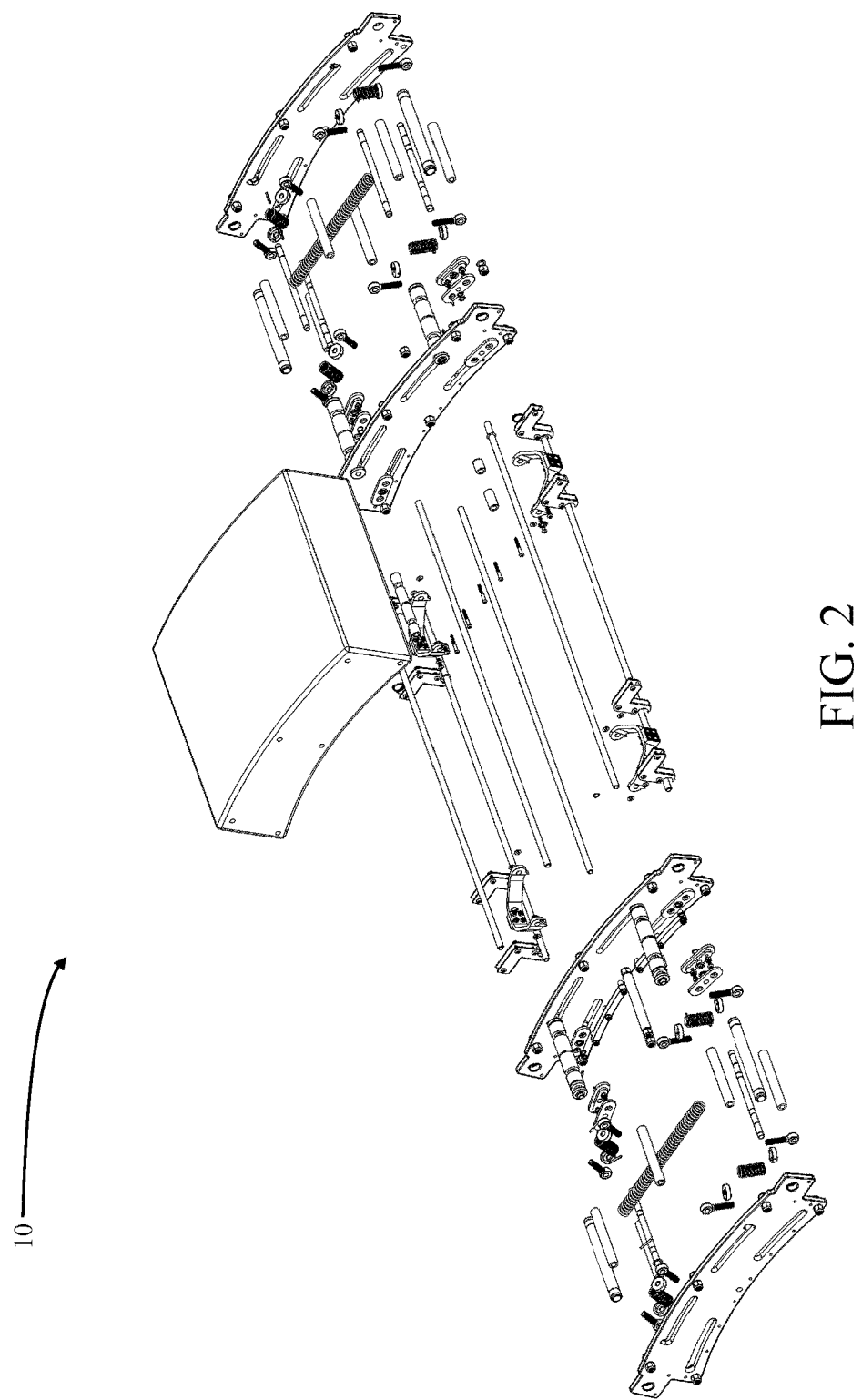
FIG. 2 shows an exploded perspective view of a canopy assembly of the racing canoe dolly, according to an embodiment of the present invention.
Figure 3:
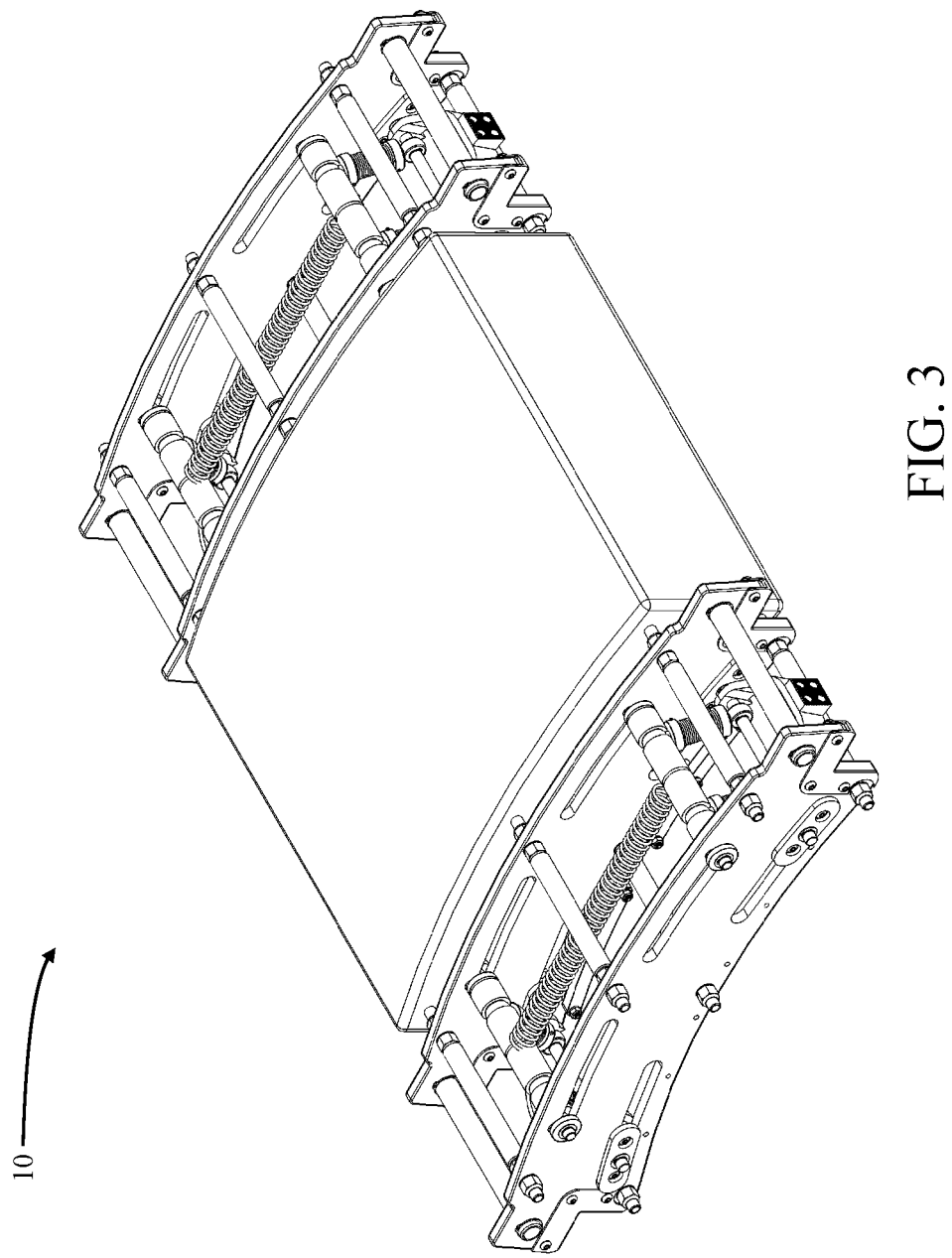
FIG. 3 shows a perspective view of a canopy assembly of the racing canoe dolly, according to an embodiment of the present invention.
Figure 4:
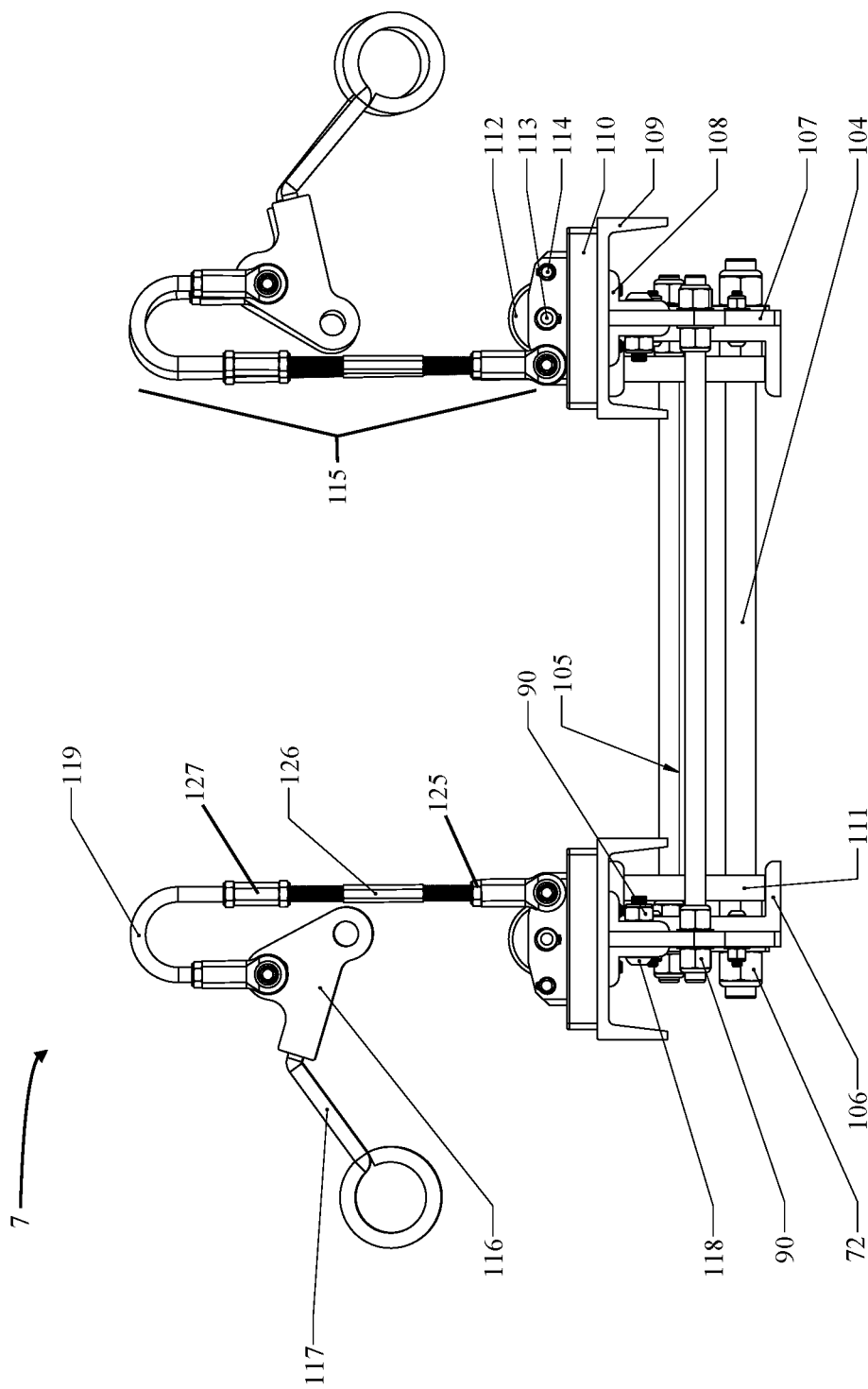
FIG. 4 shows a front elevational view of an elevator assembly of the racing canoe dolly, according to an embodiment of the present invention.
Figure 5:
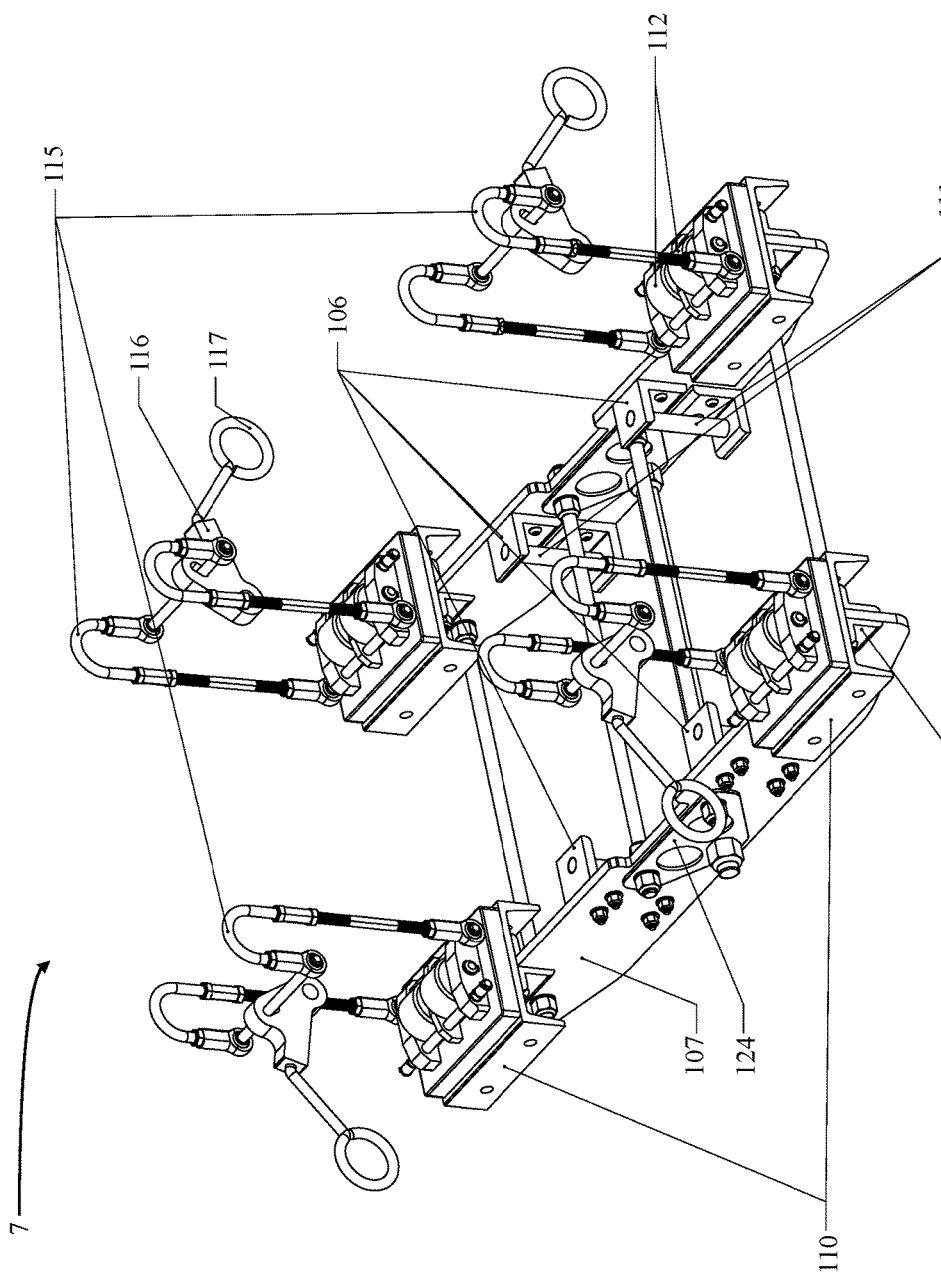
FIG. 5 shows a perspective view of an elevator assembly of the racing canoe dolly, according to an embodiment of the present invention.
Figure 6:
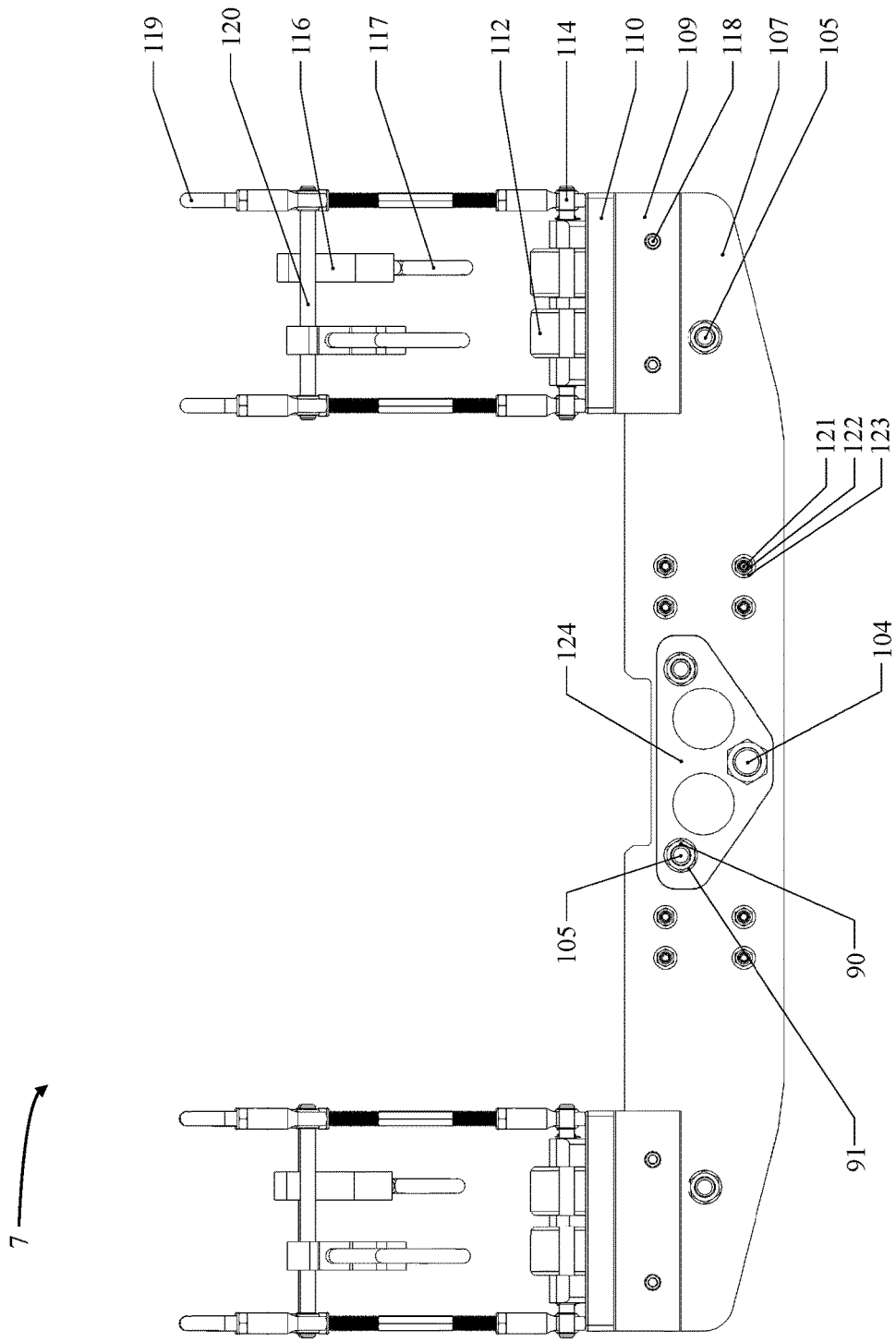
FIG. 6 shows a side elevational view of an elevator assembly of the racing canoe dolly, according to an embodiment of the present invention.
Figure 7:
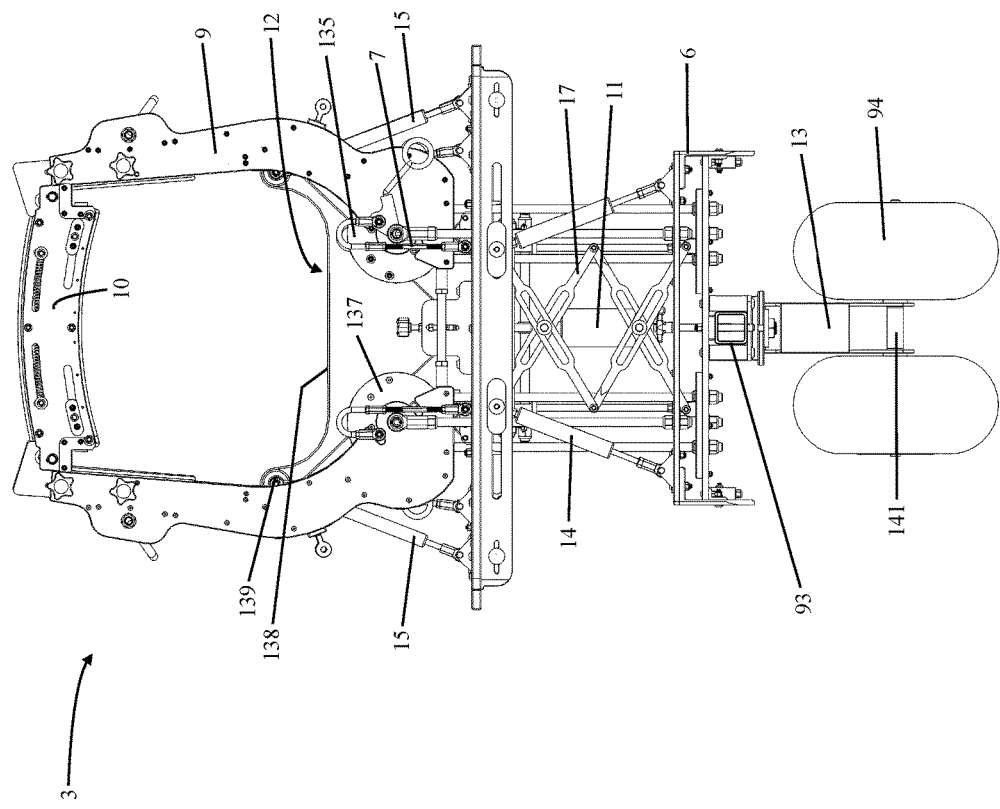
FIG. 7 shows a front elevational view of a front truck assembly of the racing canoe dolly, according to an embodiment of the present invention.
Figure 8:
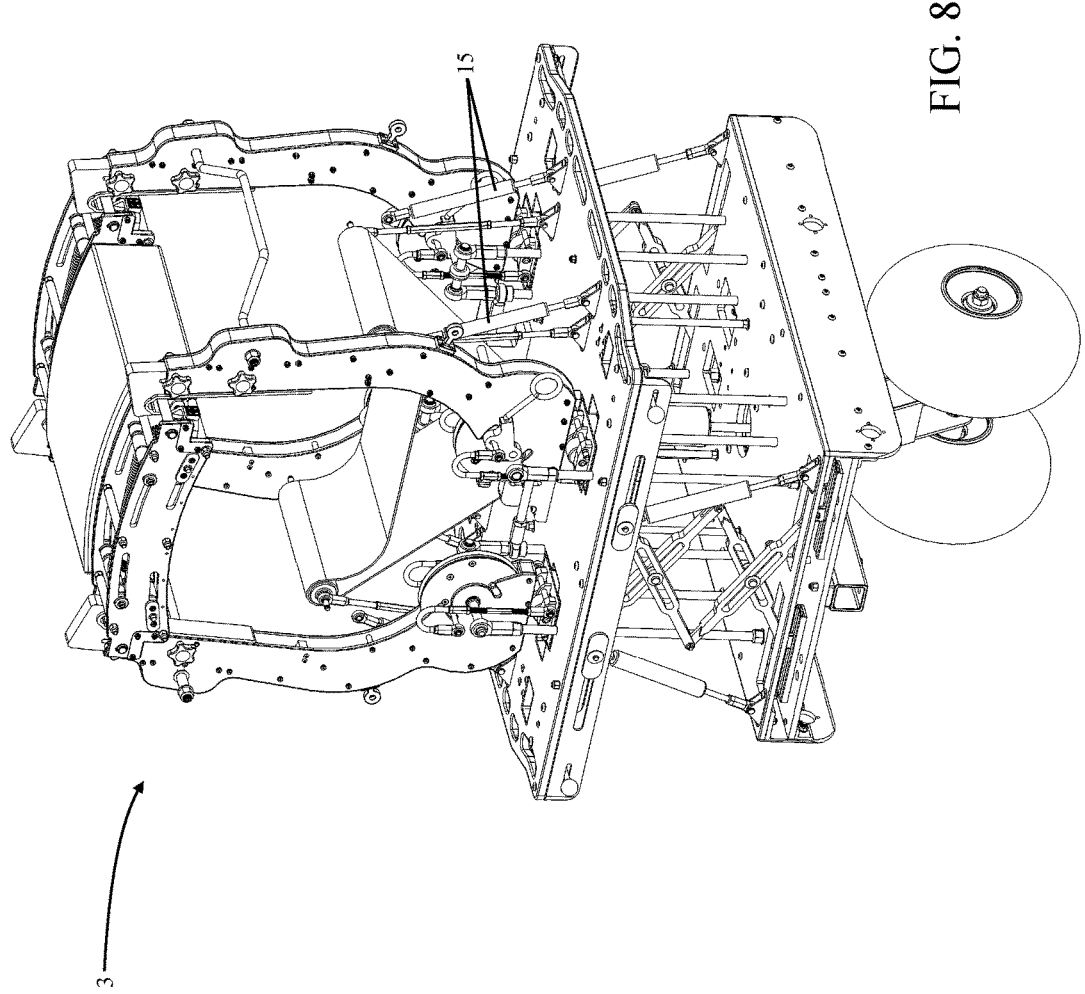
FIG. 8 shows a perspective view of a front truck assembly of the racing canoe dolly, according to an embodiment of the present invention.
Figure 9:
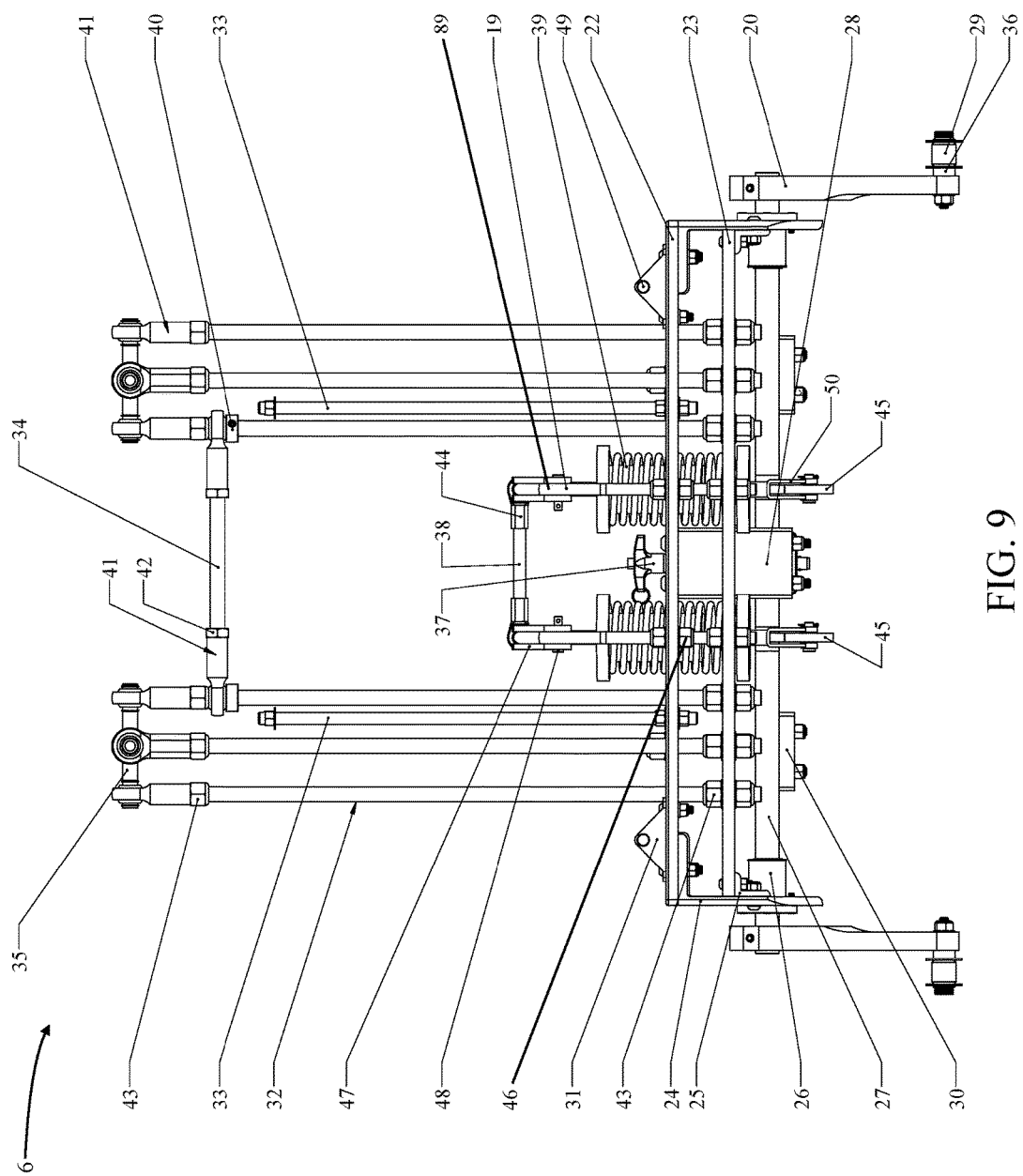
FIG. 9 shows a front elevational view of a gantry assembly of the racing canoe dolly, according to an embodiment of the present invention.
Figure 10:
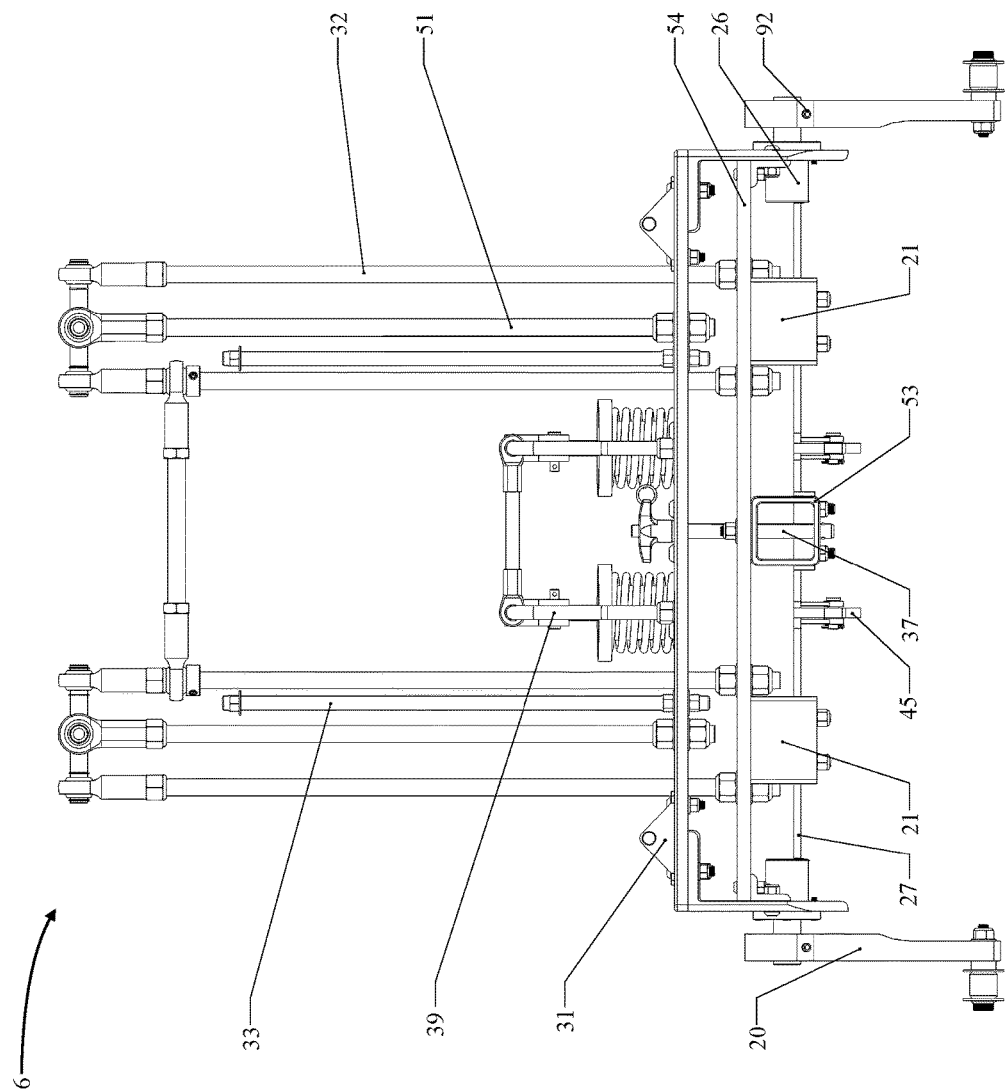
FIG. 10 shows a rear elevational view of a gantry assembly of the racing canoe dolly, according to an embodiment of the present invention.
Figure 11:
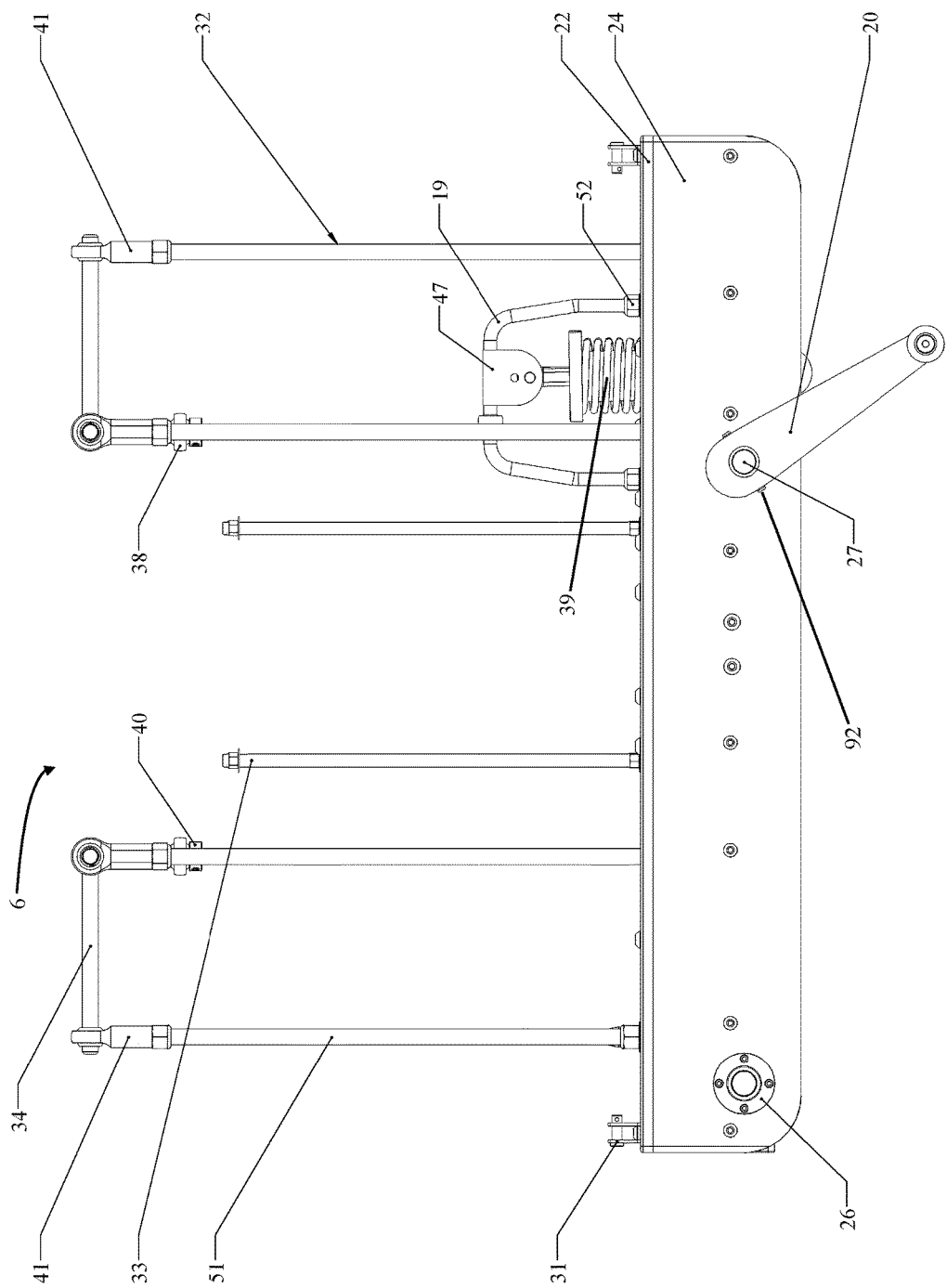
FIG. 11 shows a side elevational view of a gantry assembly of the racing canoe dolly, according to an embodiment of the present invention.
Figure 12:
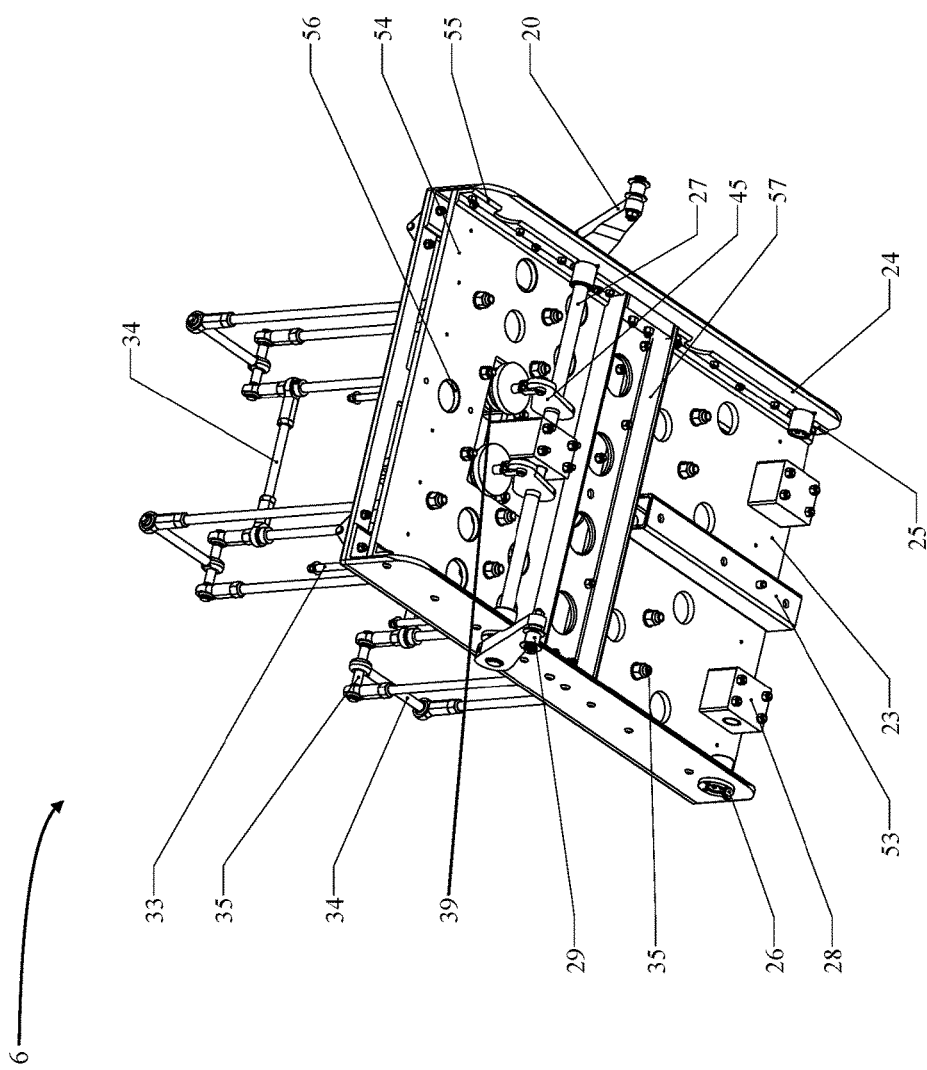
FIG. 12 shows a bottom perspective view of a gantry assembly of the racing canoe dolly, according to an embodiment of the present invention.
Figure 13:
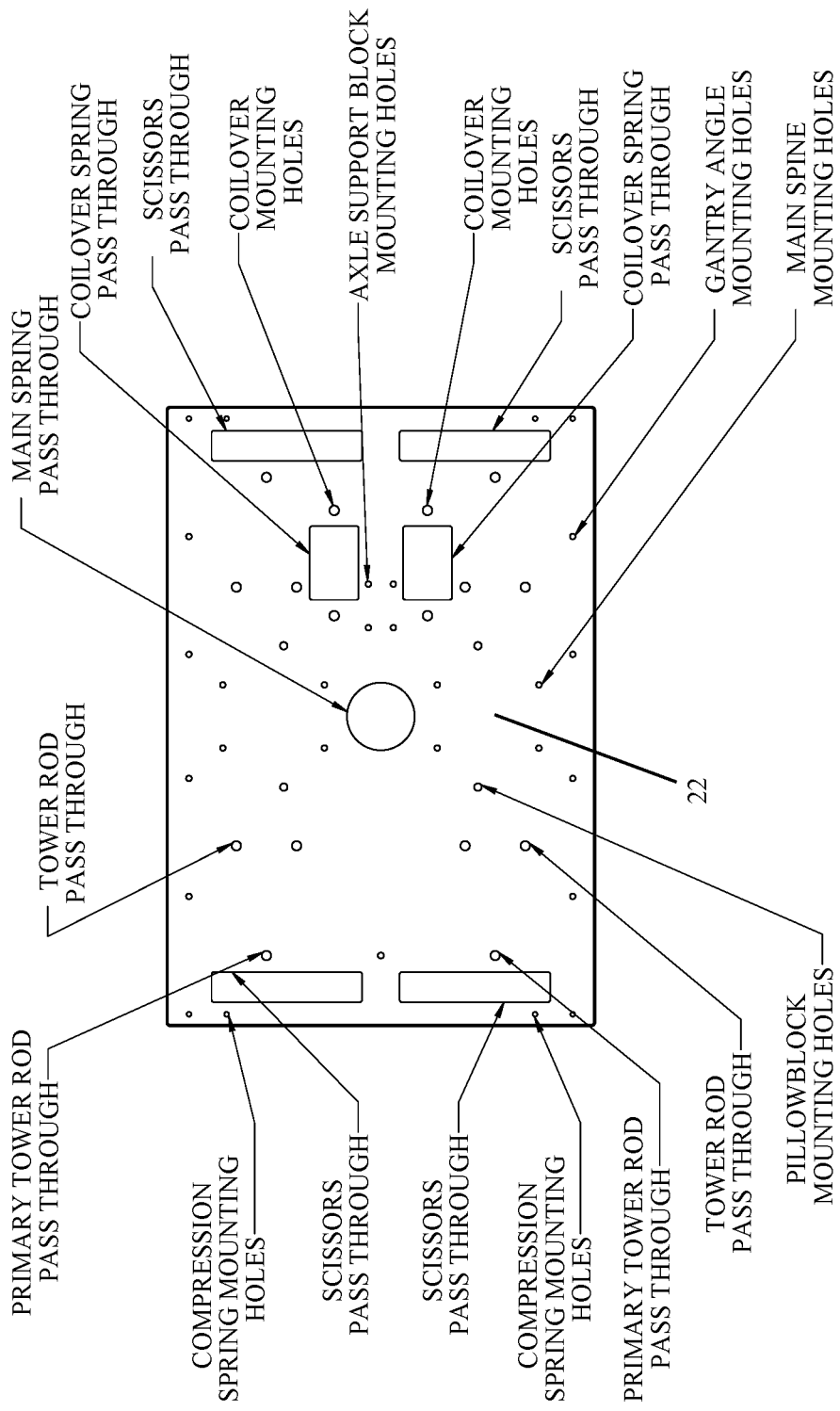
FIG. 13 shows a top plan view of a top platform sheet of a gantry assembly of the racing canoe dolly, according to an embodiment of the present invention.
Figure 14:
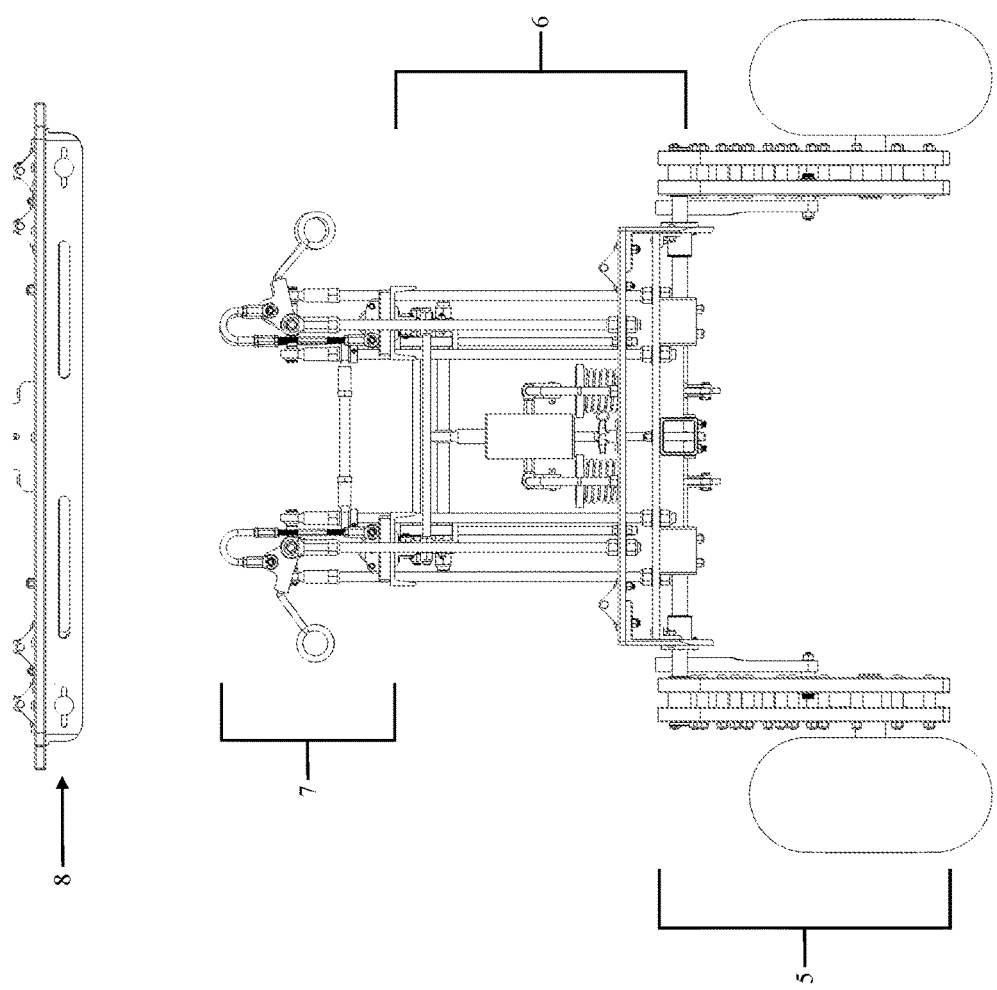
FIG. 14 shows a front elevational view of a suspension assembly, a gantry assembly, and an elevator assembly as interconnected within the racing canoe dolly, according to an embodiment of the present invention.
Figure 16:
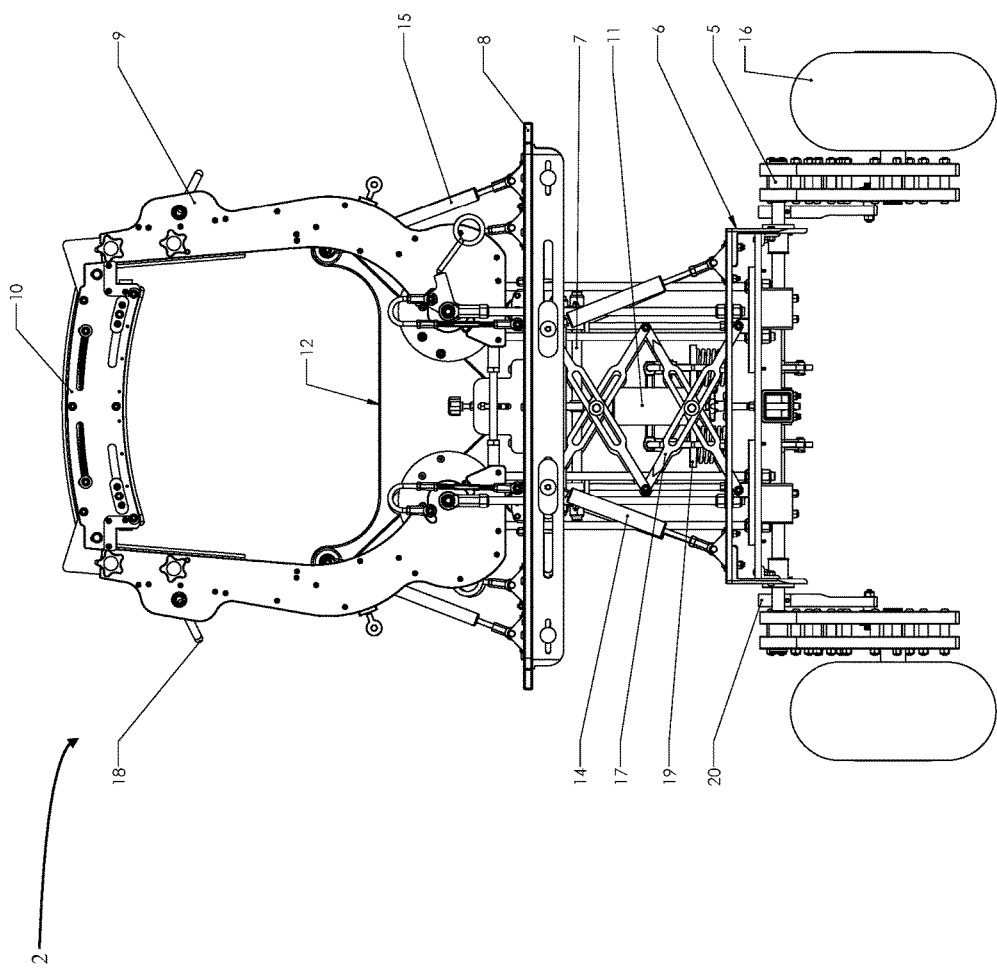
FIG. 16 shows a front elevational view of a main truck assembly of the racing canoe dolly, according to an embodiment of the present invention.
Figure 17:
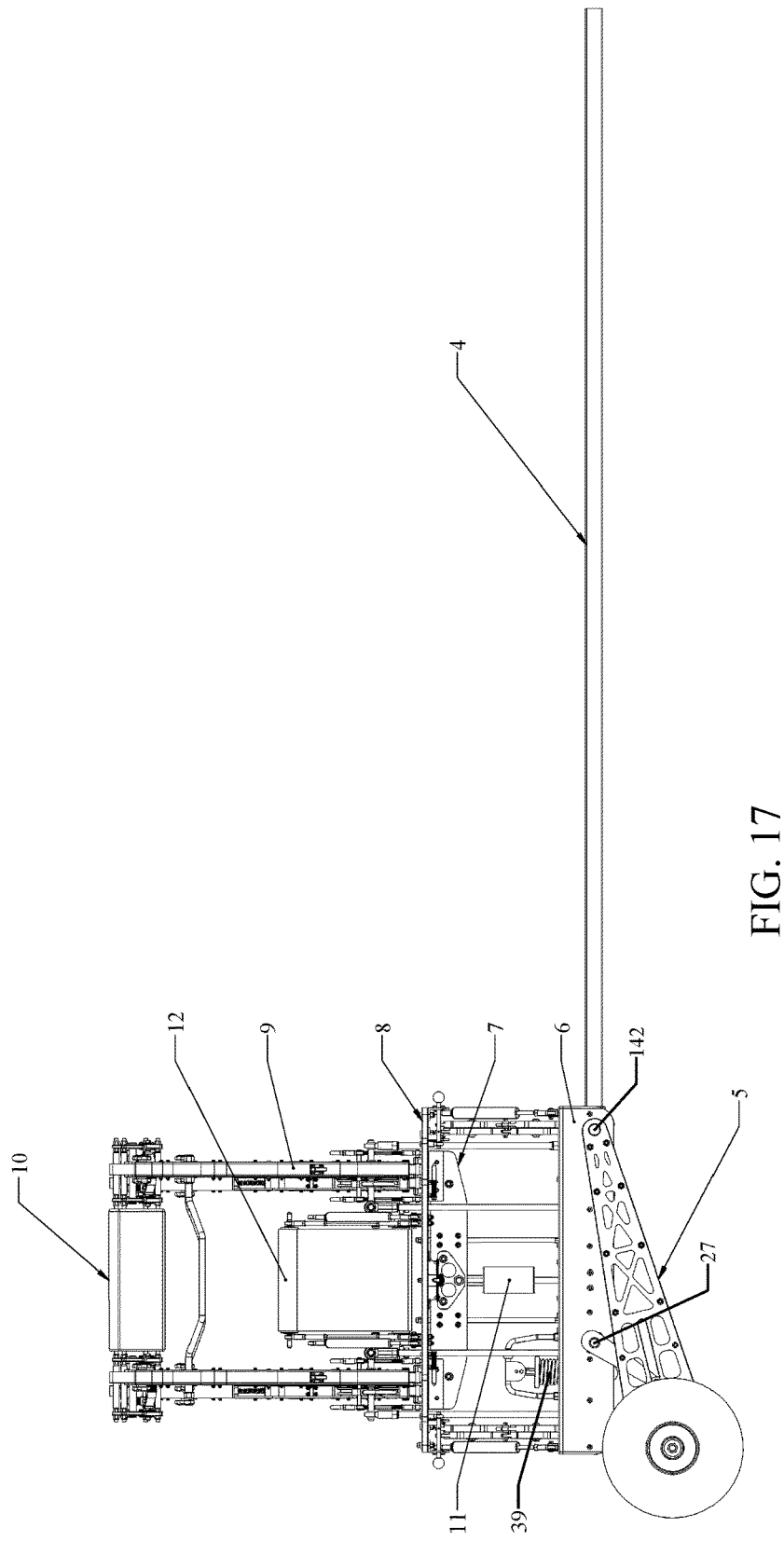
FIG. 17 shows a side elevational view of a main truck assembly of the racing canoe dolly, according to an embodiment of the present invention.
Figure 18:
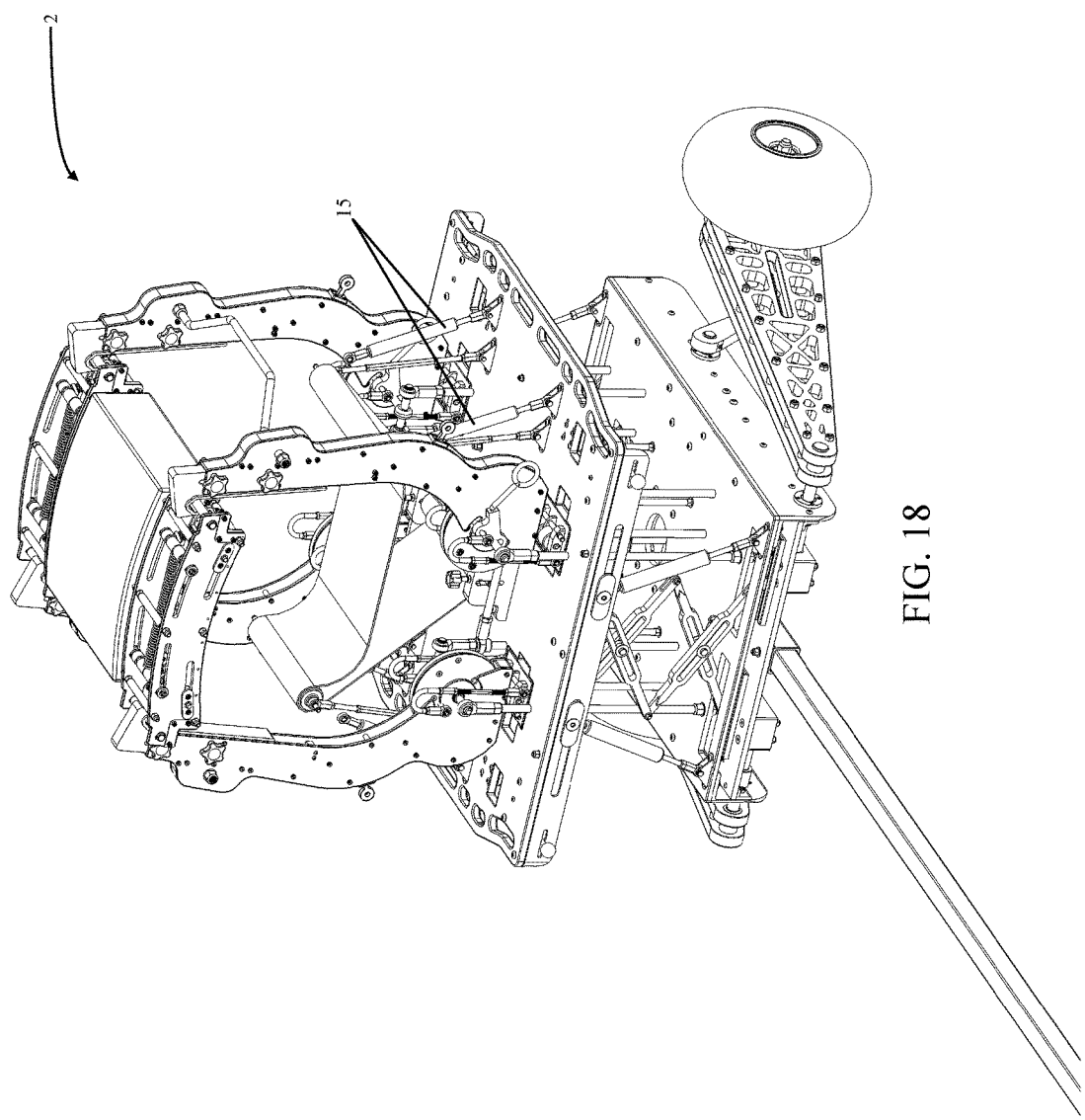
FIG. 18 shows a front perspective view of a main truck assembly of the racing canoe dolly, according to an embodiment of the present invention.
Figure 19:
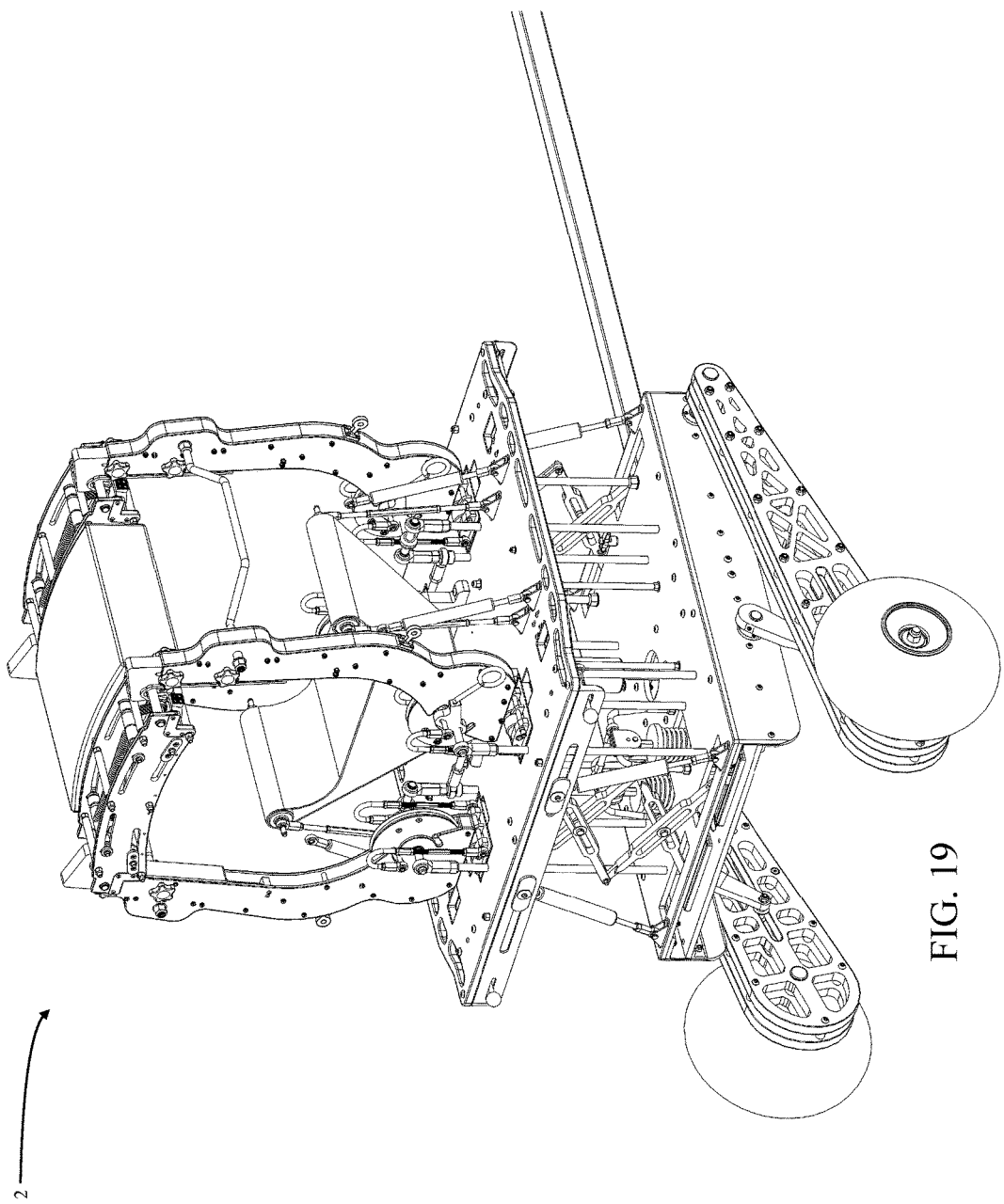
FIG. 19 shows a rear perspective view of a main truck assembly of the racing canoe dolly, according to an embodiment of the present invention.
Figure 20:
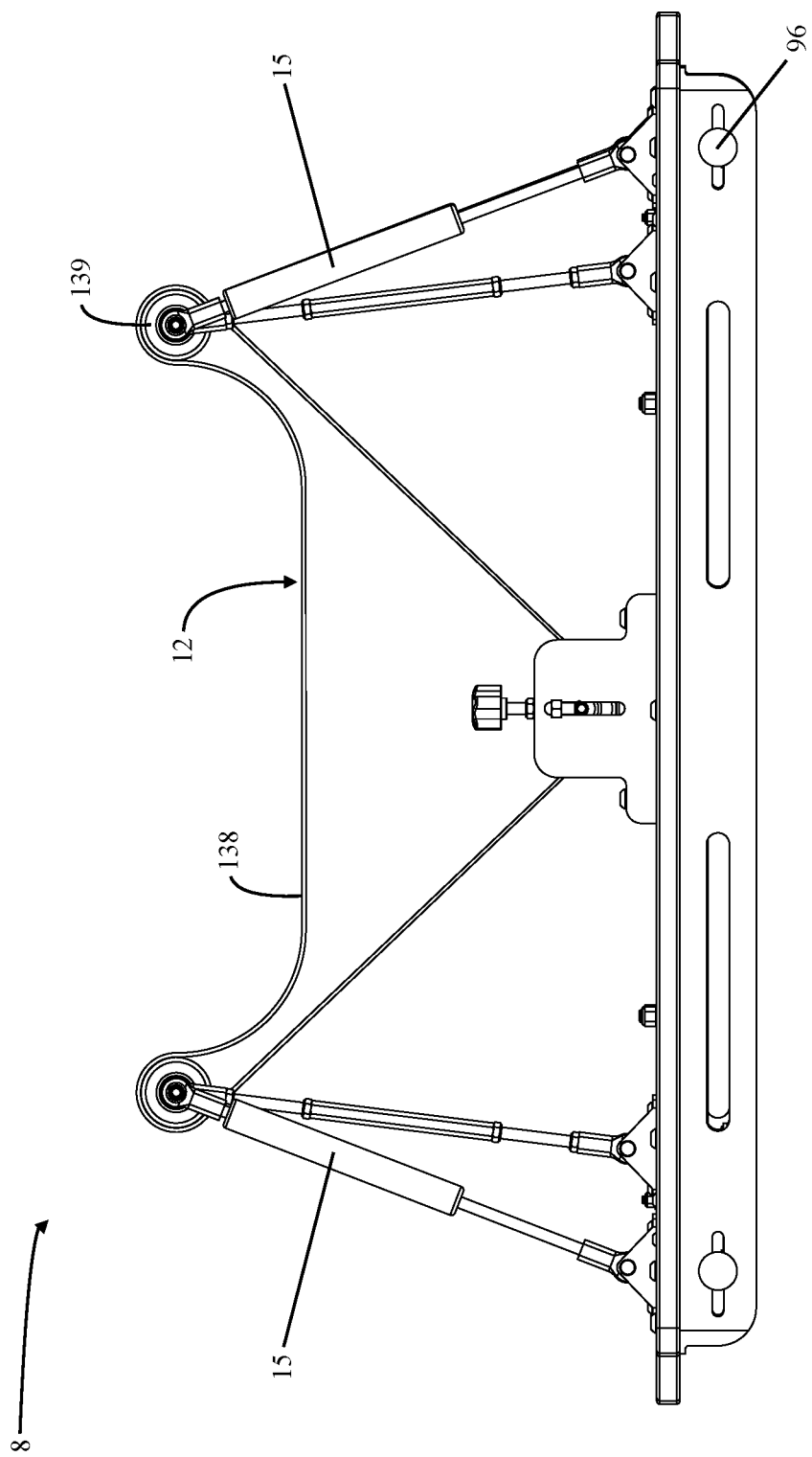
FIG. 20 shows a front elevational view of a powerhead assembly of the racing canoe dolly, according to an embodiment of the present invention.
Figure 21:
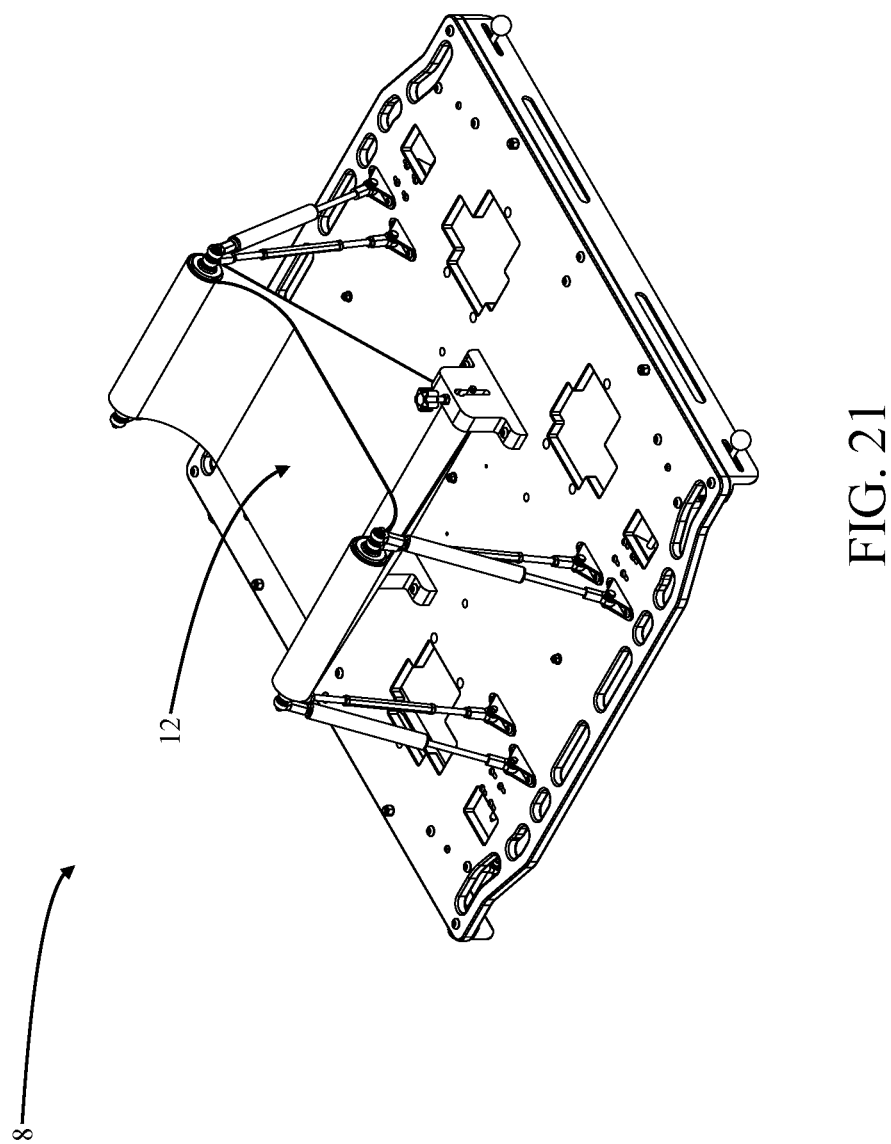
FIG. 21 shows a top perspective view of a powerhead assembly of the racing canoe dolly, according to an embodiment of the present invention.
Figure 22:
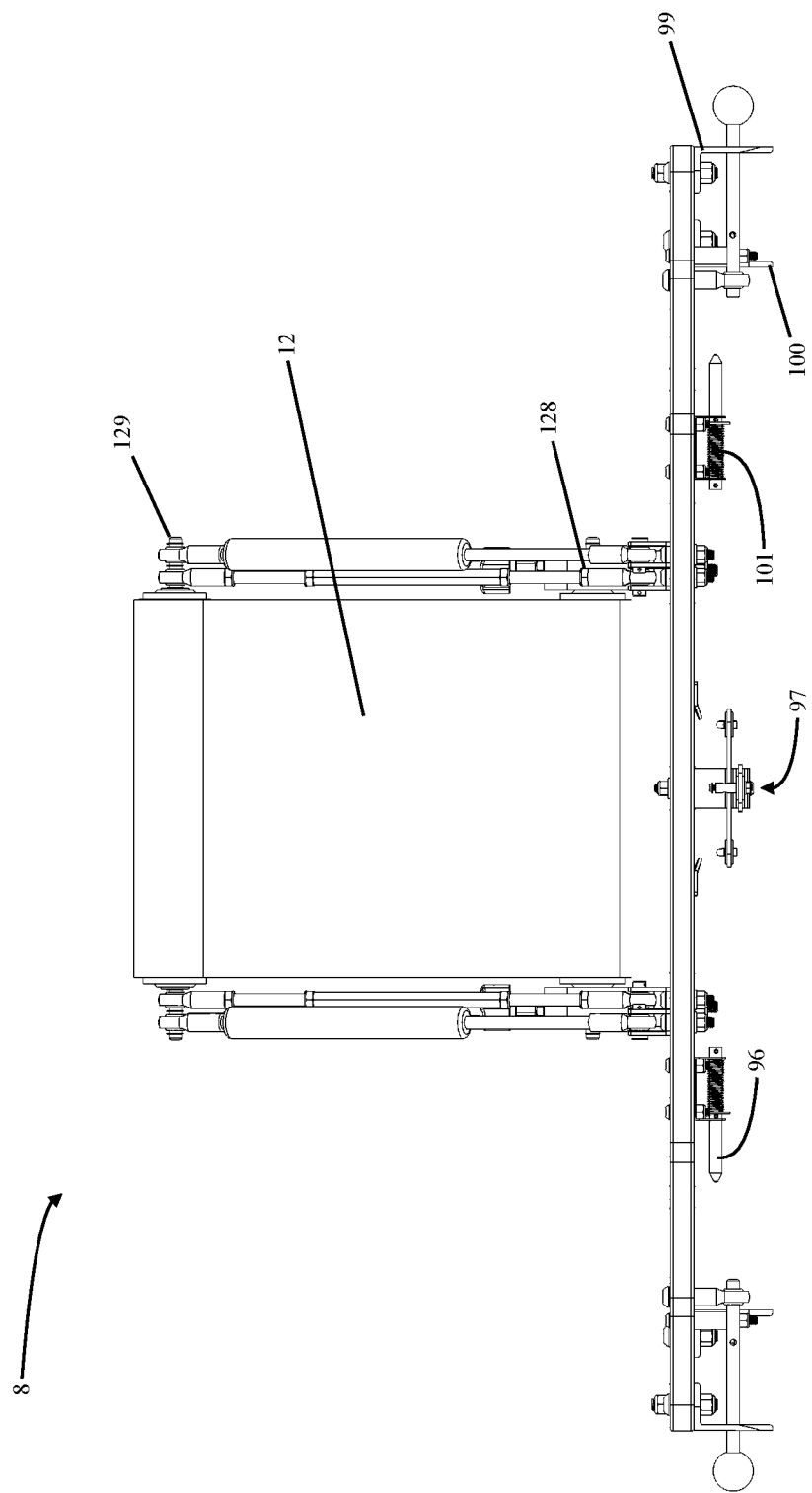
FIG. 22 shows a side elevational view of a powerhead assembly of the racing canoe dolly, according to an embodiment of the present invention.
Figure 23:
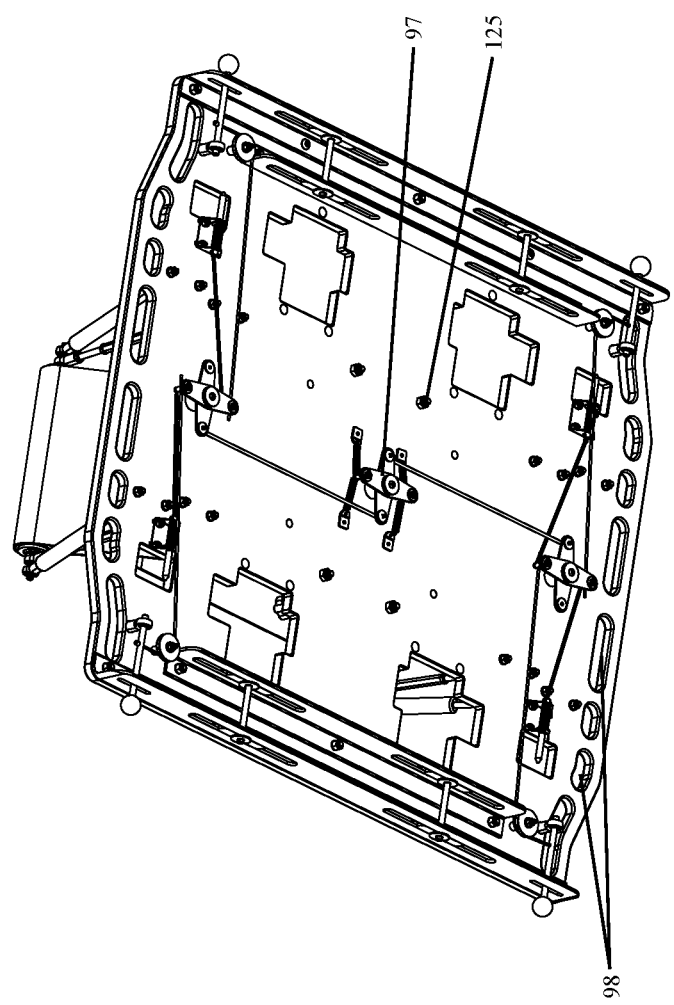
FIG. 23 shows a bottom perspective view of a powerhead assembly of the racing canoe dolly, according to an embodiment of the present invention.
Figure 24:
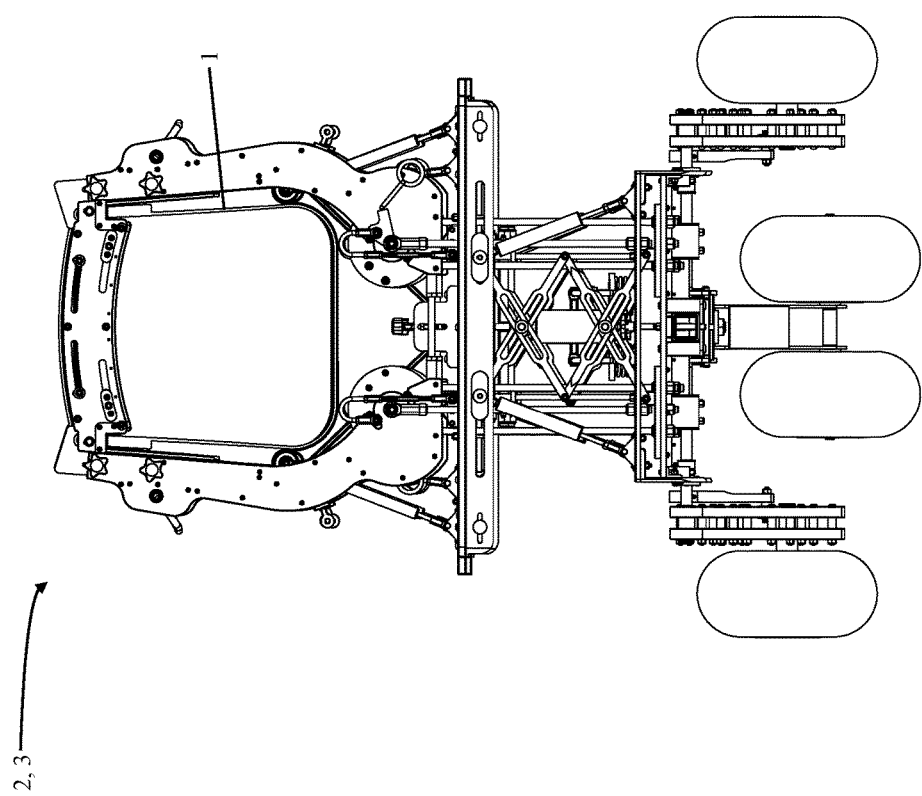
FIG. 24 shows a front elevational view of the racing canoe dolly with a canoe secured therein, according to an embodiment of the present invention.
Figure 25:
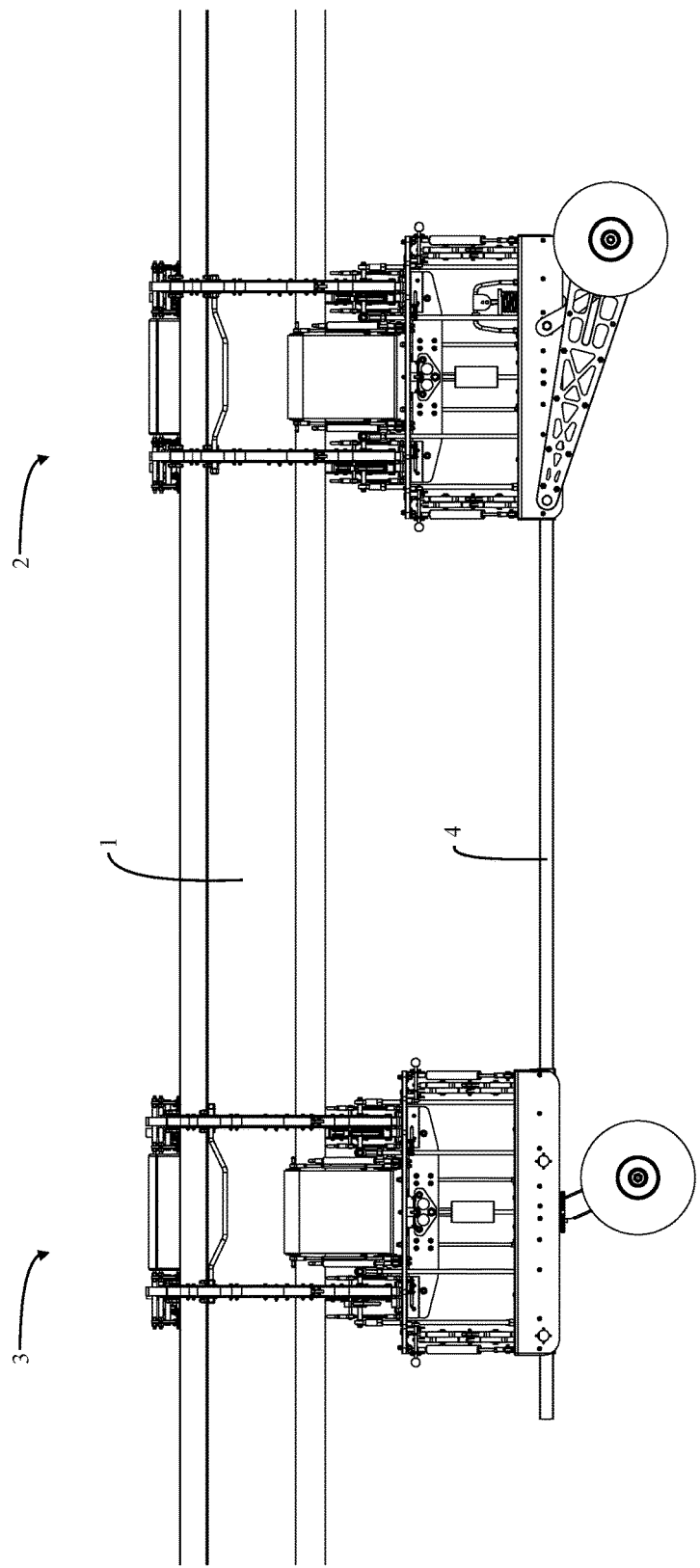
FIG. 25 shows a side elevational view of the racing canoe dolly with a canoe secured therein, according to an embodiment of the present invention.
Figure 26B:
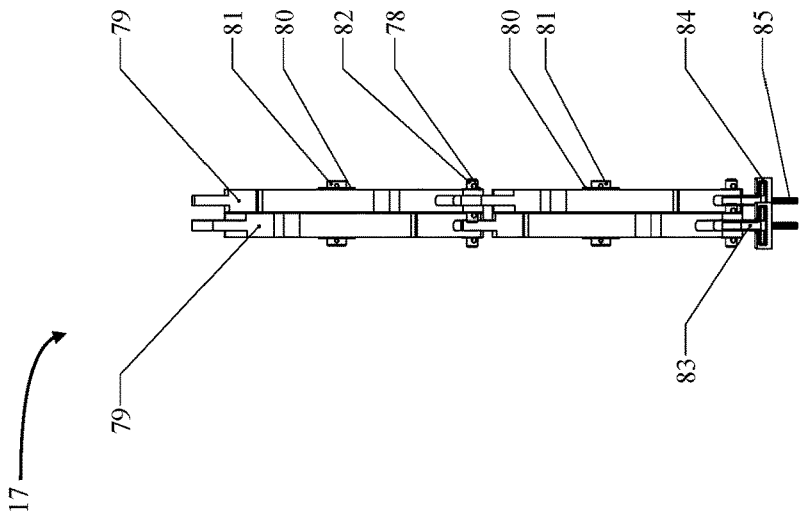
FIG. 26b shows a side elevational view of a scissors assembly of the racing canoe dolly with a canoe anchored therein, according to an embodiment of the present invention.
Figure 26A:
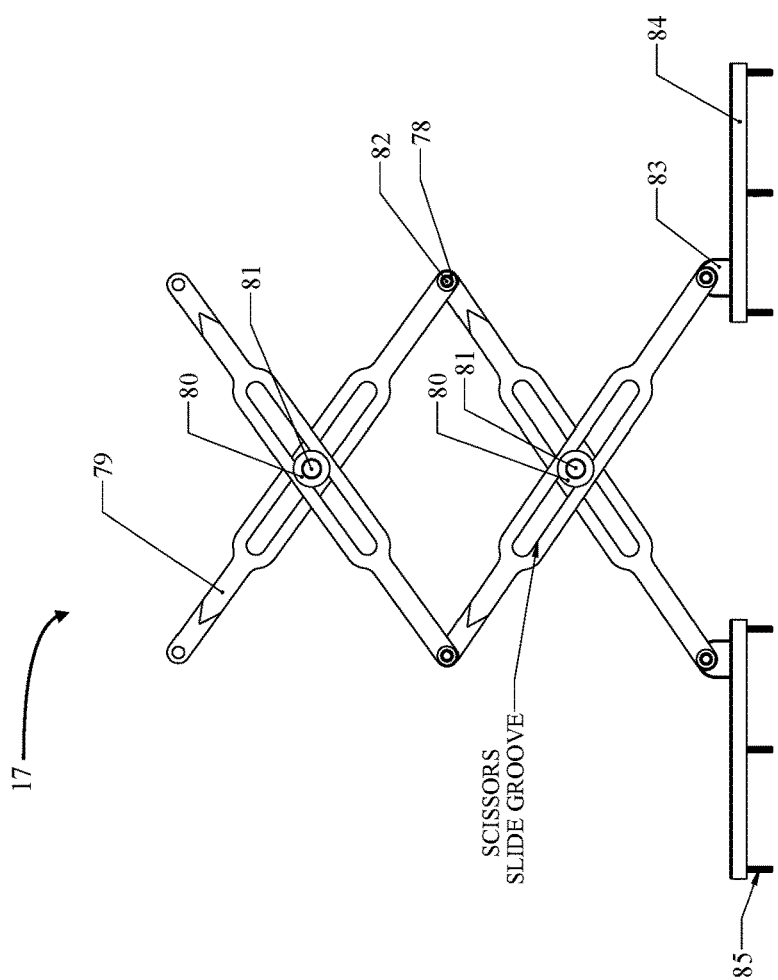
FIG. 26a shows a front elevational view of a scissors assembly of the racing canoe dolly, according to an embodiment of the present invention.
Figure 27:
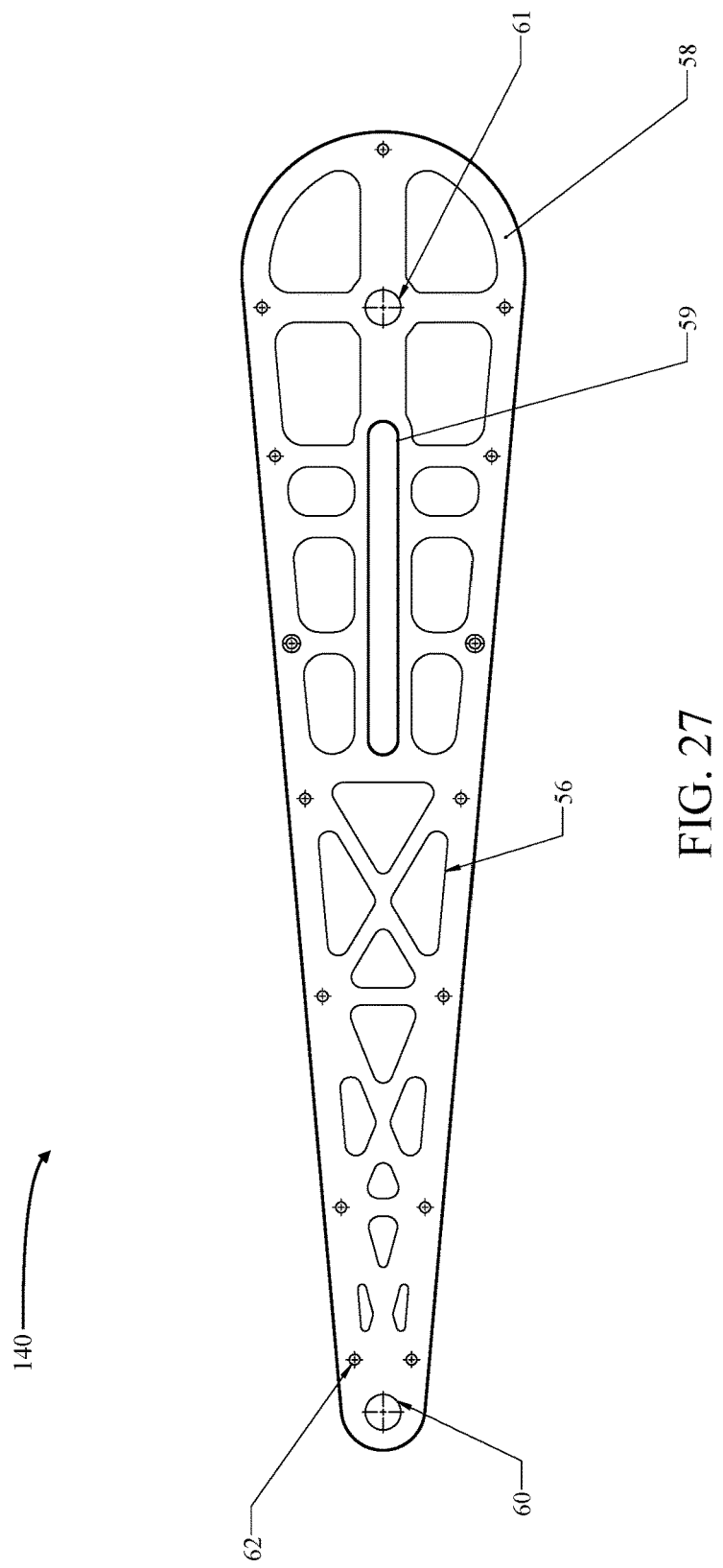
FIG. 27 shows a side elevational view of a main truck suspension arm of the racing canoe dolly, according to an embodiment of the present invention.
Figure 28:
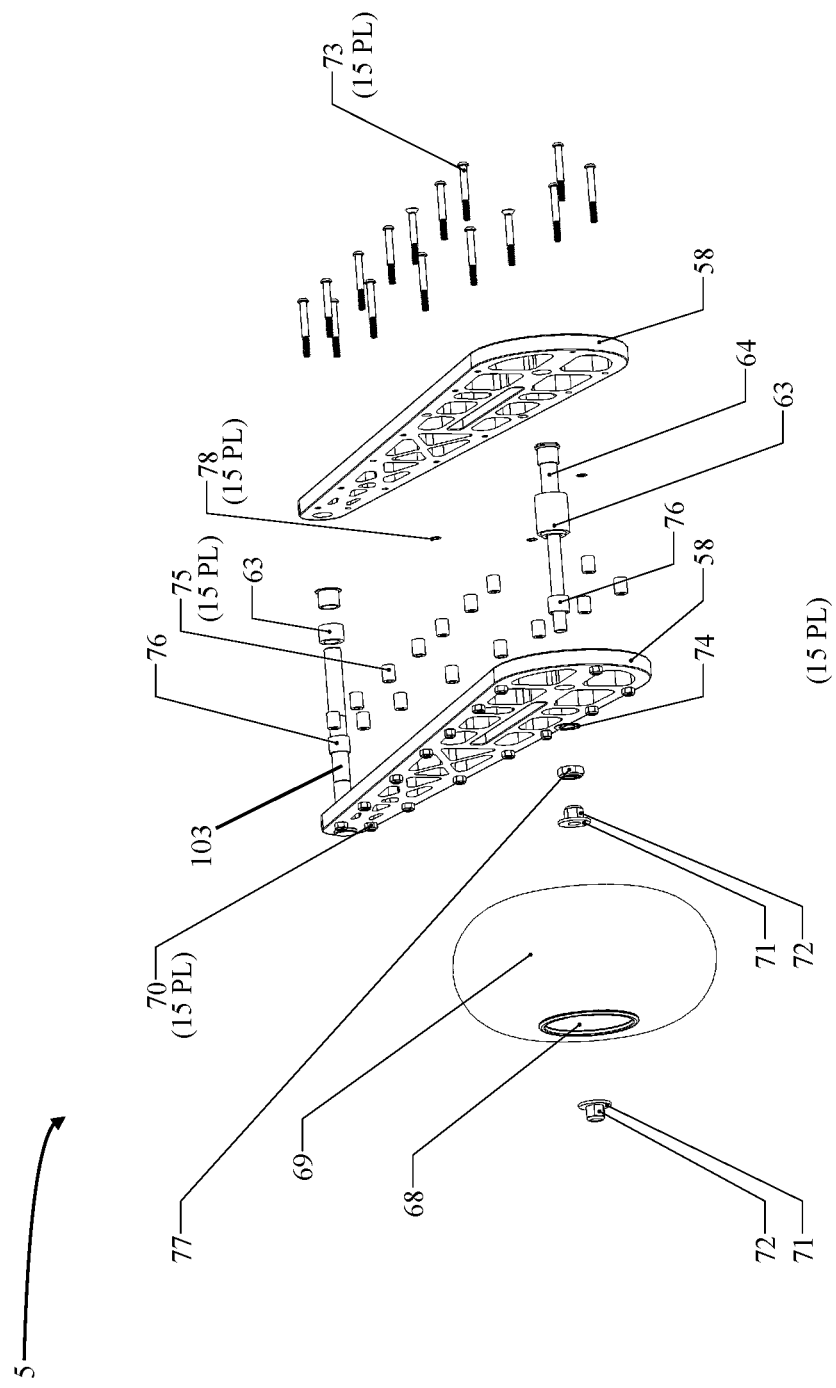
FIG. 28 shows an exploded perspective view of a main truck suspension assembly of the racing canoe dolly, according to an embodiment of the present invention.
Figure 29:
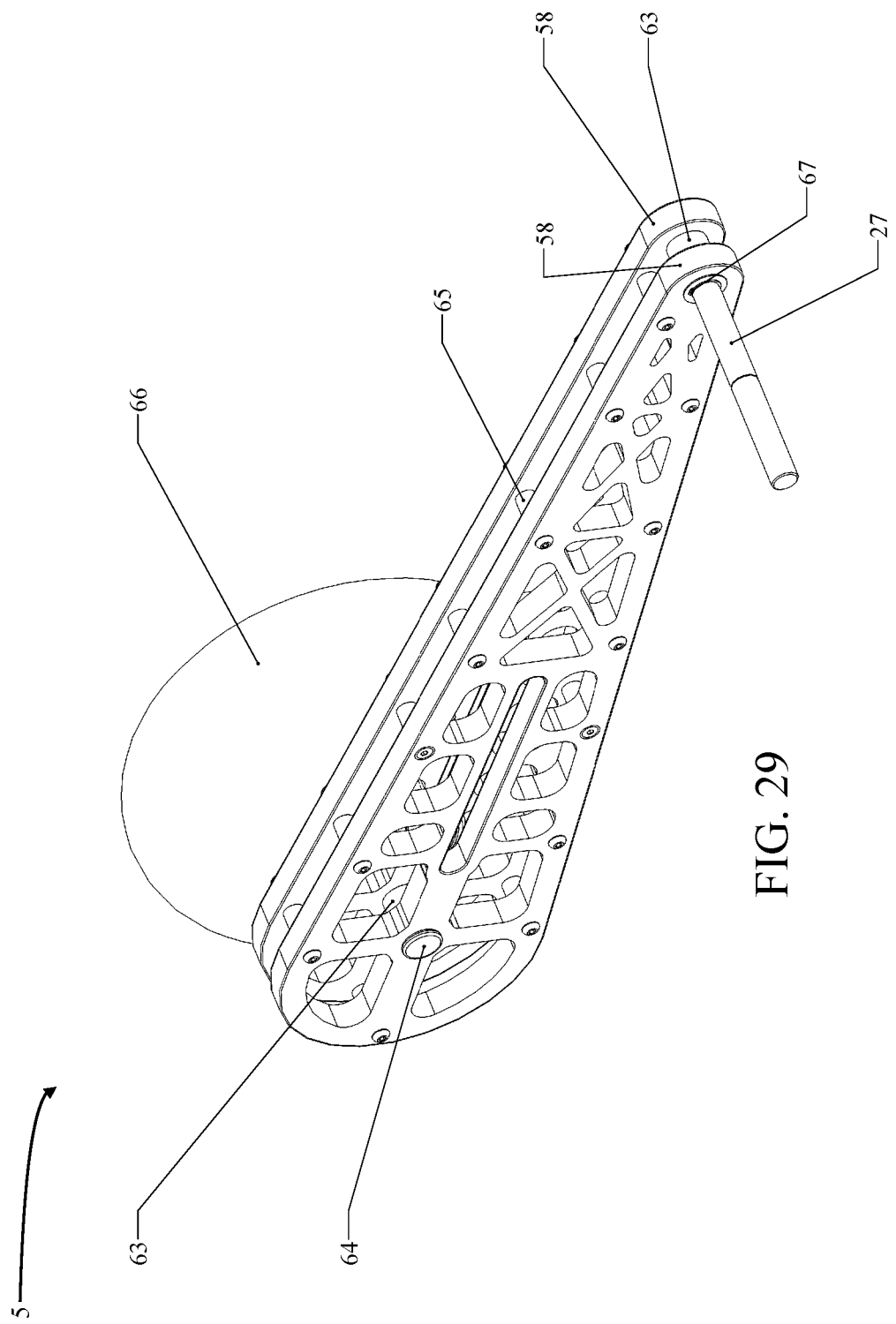
FIG. 29 shows a perspective view of a main truck suspension assembly of the racing canoe dolly, according to an embodiment of the present invention.

Preferred embodiments of the present invention and their advantages may be understood by referring to FIGS. 1a-29, wherein like reference numerals refer to like elements.

FIGS. 1a to 29 are schematic diagrams of presently preferred embodiments for a racing canoe dolly.

Racing Canoe Dolly Drawing Legend for FIGS. 1A-29:
1. Canoe; 2. Main truck; 3. Front truck; 4. Connecting rod; 5. Suspension assembly; 6. Gantry assembly; 7. Elevator assembly; 8. Powerhead assembly; 9. Arm assembly; 10. Canopy assembly; 11. Main spring assembly; 12. Belt assembly; 13. Front nosewheel assembly; 14. Compression spring assembly; 15. Tension spring assembly; 16. Main wheel and tire assembly; 17. scissors assembly; 18. Unilever assembly; 19. Coilover spring tower assembly; 20. Axle torsion lever; 21. Suspension arm support block; 22. Gantry top platform; 23. Lower gantry fwd section; 24. Gantry support angle; 25. Lower gantry fwd panel support bracket; 26. Sealed roller bearing; 27. Rearward axle half shaft; 28. Axle support block; 29. Suspension torsion roller; 30. Suspension arm support block; 31. Compression spring mounting bracket; 32. Tower rod assembly; 33. Elevator guide rod assembly; 34. Tower-to-tower cross rod assembly; 35. Tower connecting rod; 36. Lower torsion arm standoff bushing; 37. T-handle push release pin; 38. Coilover crossover rod; 39. Coilover spring assembly; 40. 0.6250 shaft set collar; 41. 0.6250 female rod end; 42. 0.6250 jam nut; 43. 0.6250 nylock nut; 44. 0.3750 female rod end; 45. Coilover lever; 46. 0.6250 nylock nut; 47. Coilover tower attachment tab; 48. 0.3250 ss. clevis pin 1.125 in long; 49. 0.3750 ss. clevis pin 0.8750 in long; 50. 0.3750 clevis female rod end; 51. Primary tower rod assembly; 52. 0.50 ss nylock nut; 53. Main truck receiver hitch; 54. Lower gantry rwd platform; 55. Lower gantry rwd panel support bracket; 56. Lightening holes; 57. Gantry main spring (upper section); 58. Suspension arm; 59. Suspension torsion lever slot; 60. Suspension arm fwd mounting hole; 61. Suspension arm rwd axle mounting hole; 62. Suspension arm mounting holes; 63. Suspension arm to arm standoff bushing; 64. Suspension axle half shaft; 65. Suspension arm standoff spacer; 66. Main truck tire and wheel assembly; 67. 1.0" ss retaining ring; 68. Main truck wheel hub; 69. Main truck tire; 70. 0.3750 ss thin nylock nut; 71. 0.750 ss washer; 72. 0.750 ss nylock nut; 73. 0.3750 ss button head socket head screw 3.5" long; 74. 1.0" ss washer; 75. Suspension arm standoff spacer; 76. Suspension arm axle bushing; 77. 1"-16 ss thin nylock nut; 78. 0.3750 ss flat washer; 79. Scissors component; 80. 0.6250 ss washer; 81. Scissor connecting pin; 82. Scissor pin; 83. Scissor foot pad; 84. Scissor foot pad track; 85. 10-24 ss button head socket head screw 1.0" long; 86. Gantry main spine (upper section); 87. 0.3750 ss button head socket head screw 1.0" long; 88. 0.3750 ss nylock nut; 89. Coilover tower; 90. 0.50 ss nylock nut; 91. 0.50 ss washer; 92. 0.3125 ss roll pin 2.75" long; 93. Front truck receiver hitch; 94. Front truck tire; 95. Front truck nosewheel assembly; 96. Return asset trigger lever; 97. Bellcrank assembly; 98. Powerhead platform sheet hand grips; 99. Powerhead outside support angle; 100. Powerhead inside support angle; 101. Arm release trigger; 102. Arm release trigger assembly; 103. Suspension arm pinion; 104. Main elevator tie rod; 105. Elevator cross rods; 106. Elevator tower support bracket; 107. Elevator vertical stanchion; 108. Elevator drive pad under bracket; 109. Elevator drive pad base; 110. Elevator drive pad; 111. Elevator glide tube; 112. Elevator pressure roller; 113. Elevator drive pin; 114. Return asset drive pin; 115. Candy cane assembly; 116. Compression lever; 117. Compression lever handle; 118. 0.3750 ss button head socket head screw 1.5" long; 119. Candy cane pushrod; 120. Candy cane connecting rod; 121. 0.25-20 ss button head socket head screw 1.25" long; 122. 0.25-20 ss nylock nut; 123. 0.25-20 ss washer; 124. Elevator gusset plate; 125. 0.3750 ss thin nylock nut; 126. 0.3750 ss male turnbuckle 6.0" long; 127. 0.3750 ss female coupling nut; 128. 0.3750 ss jam nut; 129. 0.3750 ss retaining ring; 130. 0.50 ss retaining ring; 135. Return asset assembly; 136. Return asset cable; 137. Return asset cam; 138. Belt; 139. Belt roller; 140. Suspension arm; 141. Front truck axle; and 142. Forward axle half shaft.

This product provides a highly functional and powerful transport dolly for use on open ocean outrigger 6-place racing canoes as a method to transport from waterline to storage building or other location up the beach head and back down again. It also provides a mechanism that serves as a moored docking station for the canoes in the surf to expedite crew rotations. This device allows for the transport of the canoe to be done at waist height to eliminate fatigue and back injury common in today's practices. The device "grapples" the canoe and thereby creates a firm set of "landing gear" for the craft. This device does no damage to the vessel; but utilizes linear dynamics along it's hull to capture the vessel rigidly while under transport.

A three dimensional support system utilizing acetal plates, aluminum angles, stainless steel rods and tubes, scissor supports and hardware create the skeleton of the unit(s). The bulk of the unit is constructed of plastics and aluminum extrusions attached to the undersides in strategic places to provide rigid support. Plastic material will be acetal in most cases; but could include a similar products that have a high strength and very good resistance to corrosion. The weight of this product not fully ascertained yet. There are no motors, electronics, wiring, relays or external devices necessary for operation. Kinetic energy is developed by human resistance input against the main gas strut and returned in the form of linear kinetic energy again; once triggered. Basically put; the unit clamps onto the hull from underneath automatically; gripping vertically downwards towards itself until equilibrium is reached, an over-lock is applied, and the canoe is trapped. This action "marries" or "locks" the device to the bottom of the hull like a powerful vice; creating "landing gear" for the canoe to be transported over the toughest terrain (within reality) without harming the vessel attached.

There are a number of major assemblies:

Suspension Assembly:

The Suspension Assembly is unique in many ways. It is comprised of two (2) 1" thick acetal elongated teardrop shaped profiles bolted side by side with a 1" gap in between provided by spacers, screws, washers and nuts. This assembly provides the cushion and suspension for the canoe and all it's dynamic loads and transmits those loads to the ground. The Suspension Assembly is mounted on each side of the Gantry Assembly with the Suspension Arm Pinion going through bushings on each outer side of the Gantry Support Angles and then anchored underneath of the Gantry Assembly by way of the Main Axle Support Block. This connection provides the vertical rotation of the Suspension Assembly. On each side of the Gantry Assembly (fastened to the Gantry Support Angles); there is a Torsion Arm or lever extending and rotating downwards. These 2 Torsion Arms are independent of each other and mounted on 2 separate axles and directly connected to each of the 2 Coil-over Springs at the centerline of the Gantry Assembly. This provides the downward force necessary for the Suspension Assembly to function and support the weight of the canoe and all the machinery above the Gantry Assembly. This Torsion Arm rides in a groove within the centerline of the Suspension Arm. This mechanism allows the Main Truck to crab and traverse the terrain without bottoming out.

Another important feature of this assembly is it's makeup. In an engineered measure; much of the solid surfaces of each vertical member have been cored (removed) to provide weight reduction and nearly unfettered access to the water flow drainage surrounding it. This is specifically done to remove as much flat plate drag on the total assembly. If water can pass through the device horizontally and drain vertically, with the least resistance possible; then the total unit will be less affected by the surf. This feature adds to a stable platform that can actually be tethered in the surf as a rotation platform for racing purposes with minimal wave surge effects.

Gantry Assembly:

This assembly forms the base or bottom structure to support the weight of the canoe and upper mechanisms and transmits that load uniformly to the Suspension Assembly and wheels positioned below it. It consists of a horizontal and rectangular (42"×30") sheet of high grade plastic support base comprised of a ½" thick acetal (or similar material) sheet that has two (2) 3"×6"×⅜"×42" aluminum "L" shaped Gantry Angles rigidly bolted to the outer longitudinal sides, and a 3"×6"×29.25" aluminum Main Spine Assembly bolted to the center and underside of the Gantry Top Platform Sheet that is perpendicular to the line of travel for rigidity and load support. Fore and aft of this Main Spine Assembly, and an approximate 2" distance; are fastened a second level (or lower level), comprised of two (2) additional ½" thick horizontal plastic plates that are also attached to the vertical Gantry Angles, (each being 28"×18"), parallel with the upper level; are fastened onto the vertical side angles of the Gantry Top Platform Sheet.

This creates a second tier, or level which reinforces the unit's stability; provides a vertical 2" "choke" for the stainless steel Tower Rod Assemblies to increase their strength exponentially as to sway or angular drift. These are called Gantry Lower Level Front Platform; and Gantry Lower Level Rear Platform respectively. Mounted on these two lower platforms are 10 stainless steel tubes rising vertically from their attachment points on these panels up and through the aforementioned upper Gantry Support Base and continue vertically up to the Powerhead Assembly where 6 of them are fastened firmly to the Powerhead Platform Sheet. 2 additional tubes slightly smaller in length are attached to the Gantry Support Base but do not pass through down to these lower panels due to different undercarriages between the two trucks. All parts are made the same with the exception of the undercarriages.

These 12 tubes are approximately 25 inches in length and are threaded at both ends. These tubes are grouped in 4 banks of 3 tubes each and are placed in each of the 4 quadrants on the Gantry Support Base. These tubes are also fastened to the Gantry Assembly on the lower support panels. The purpose of these groups of tubes is to provide rigid support for the extreme loads from above and to provide an internal skeleton (framework) for the upper assemblies to be guided on and operate in up and down directions. All 3 tubes in each quadrant are connected together at the top with horizontal cross rods. This functions as a three way trestle that interconnects the tubes and becomes the central pivot point for the Arm Assembly above, which grips the canoe.

Underneath the Lower Gantry Sheet are two (2) independent axles mounted approximately mid-plane along the length of the aluminum angle. These axles mount the two (2) Suspension Arms that support the vehicle. These are the points of rotation for the Suspension Arms in the main truck. They are not used in the Front Truck. These provide shock and sway control during transport of the canoe. The axles; therefore, react independently to each other, and allow 8" vertical displacement or 45 degrees of rotational movement to clear obstacles, dunes, curbs and rocks. Attached to the lower end of these axles are two 18"×12" sand tires with non-corrosive composite rims. A simple safety brake can be incorporated to arrest unwanted movement. Optional wheel/tire sizes can be substituted.

Also mounted underneath and on centerline is the Receiver Hitch. This is the connecting method for joining the Main Truck to the Front Truck with the Connecting Bar. Both are constructed with standard 2.6" aluminum square tube. The Main Truck Receiver Hitch is cut and mounted to only go from the front of the truck to the perpendicular centerline. The Front Truck Receiver Hitch, however, is cut to mount full length under the centerline of the unit as to be the place for adjustment of the distance between each of the trucks. There are several holes drilled through along the centerline of the Connecting Bar and each of the trucks have a mating hole to align with these holes. With this adjustment, the operating crew can adjust for changes in hull length, CG issues, terrain compensation and crew seat position that may vary from one canoe to another. The Connecting Bar goes through the Front Truck Receiver Hitch entirely and is pinned about ⅓ out as is normal, but more holes are available fore and aft for adjustment. There also is an eye bolt that is fastened at the front end of the Connecting Bar so that if towing the device and canoe is desired, there is a place to connect a rope or cable to. The Main Truck Receiver Hitch is pinned in one place only. Both trucks are pinned in place by a stainless steel pin or T-Pin catch.

Elevator Assembly:

The Elevator Assembly is a guided level structure that is the conveyance of power between the Main Spring and the four (4) Arm Assemblies that capture the canoe on the Powerhead Assembly above. It is a structure that is comprised of two (2) acetal or aluminum vertical stanchions ⅜" thick by 4.5"×30" that are strategically spaced apart by four (4) acetal horizontal and perpendicular threaded rods that run through both vertical members and are spaced and secured with washers and nuts Fastened horizontally and on the top edge on these 2 stanchions are four {4} Elevator Pad Assemblies. These are made of acetal and have horizontal stainless steel rollers embedded in the top surface. This is the contact and pressure point between the spring force and the back of each Arm. The back of the Arm Assembly is engineered as a cam and has a special profile built in that directs the speed and direction of the arm as the pressure from below is applied against it. The roller applies the pressure directly against this surface to operate the device. The Elevator Assembly rides vertically along four (4) ½" diameter 18.5' long stainless steel threaded tubes that are firmly attached to (and part of) the Lower Gantry Assembly. These rods extend up from the Lower Level Gantry surface up through the top level and also through the Powerhead Assembly; terminating at the top surface of the Powerhead Assembly with a nylock nut and washer. This becomes the finite amount upward travel limit for the Elevator Assembly.

The Elevator Assembly is a guided level structure that is the conveyance of power between the Main Spring and the four (4) Arm Assemblies that capture the canoe on the Powerhead Assembly above. It is a structure that is comprised of two (2) acetal or aluminum vertical stanchions ⅜" thick by 4.5"×30" that are strategically spaced 15" apart by four (4) acetal horizontal and perpendicular threaded solid rods that run through both vertical members and are spaced and secured with washers and nuts. 4 of these rods are ½" stainless steel, and the center rod is ¾" stainless steel. The Main Spring fastens onto this ¾" rod and the pressure is diffused throughout the Vertical Stanchions and the Elevator Drive Pad Assemblies.

Fastened horizontally and on the top outer edge on these 2 stanchions are four {4} Elevator Pad Assemblies. These are made of acetal and have horizontal stainless steel rollers embedded in the top surface. This is the contact and pressure point between the Main Spring force and the back of each Arm. These Elevator Pad Assemblies are positioned on the top outside edge of each stanchion and are reinforced with aluminum angles underneath that are bolted through the stanchion. This positions each Elevator Pad Assemblies firmly to transmit the pressure from the Main Spring/Elevator to the backsides of each Arm. The back of the Arm Assembly is engineered as a cam and has a special profile built in that directs the speed and direction of the arm as the pressure from the Elevator Drive Pad coming up from below is applied against it. The roller applies the pressure directly against this surface to operate the Arms. The Elevator Assembly rides vertically along four (4) ½" diameter 18.5' long stainless steel threaded tubes that are firmly attached to (and part of) the Lower Gantry Assembly. These rods extend up from the Lower Level Gantry surface up through the top level and also through the Powerhead Assembly; terminating at the top surface of the Powerhead Assembly with a nylock nut and washer on the top surface of the Powerhead Platform Sheet. This becomes the finite amount upward travel limit for the Elevator Assembly. The Elevator Assembly is allowed to transit from the underside of the top nut on these 4 tubes downward. Movement in this direction is controlled my the resistance of the Main Spring and the weight/load against it.

Vertical movement is controlled by 4 sets of brackets each consisting of short aluminum or plastic angles, 4" Teflon Glide Tubes that actually ride on the stainless steel tubes that connect the Gantry to the Powerhead. This particular length of Glide Tube eliminates any chatter or binding between the Elevator and the Glide Tubes. These are fastened to the Vertical Stanchions with screws washers and nuts.

Powerhead Assembly:

This consists of an upper ¾" thick acetal platform that has angles attached to it's underside to support loads and create support brackets and transit slots for the Scissors Assembly and Compression Springs below. This Powerhead Platform Sheet has pass through holes and mounting holes through it, but it also has cutouts for the Elevator Drive Pads to come up through this Platform Sheet, contact the undersides of each Arm and apply pressure to rotate the Arms.

On the underside the Powerhead Platform Sheet are mounted mounted 3 Bell-cranks and 2 connecting stainless steel connecting rods to keep all 3 bell-cranks are synchronized. These bell-cranks have cables running to each corner of the Powerhead Platform Sheet to 4 Trigger Lever Assemblies. These triggers release the cocked Arms by activating the Arm Release Latch. Only 1 trigger needs to be pulled in order to release all 4 Arms. When the Arms are being pulled back; all 4 latches need to be engaged.

On the top side of the Powerhead Platform Sheet are mounted 4 Gas Tension Spring Assemblies and 4 Roller Belt Traveler Assemblies. These assemblies supply rigidity, mountings and rotational stability to the Belt Assembly. The Roller Belt Traveler Assembly is adjustable to provide tightness or looseness to the fit of the belt around the canoe's profile and to adjust the pressure the Belt Rollers have against any given hull profile.

The function of the Gas Tension Springs is to constantly supply a pull from the sides of the Belt so that it always takes in the slack from no load and then conversely gives up when load is applied, but the end result is that the springs help center the load of the canoe in the right centered spot. These gas springs are set at 45 ft lbs each so hen the load of the canoe at that point is 325, these tension springs will yield and allow the traveler assemblies to roll over towards the hull and apply pressure until equilibrium is achieved by the Belt's resistance to the load.

Canopy Assembly:

This consists of a structural top "restraint system" made from acetal cross ribs running perpendicular to the canoe's centerline, and stainless steel threaded rods that run parallel with the canoe. There are four (4) ⅜"×3"×23" cross plates shaped in a slightly inverse arc that rests on the top edge of the canoe's gunwale. The actual canoe contact points on both sides of the ribs have 60 durometer neoprene rubber foot pads at the outer lower edges. Each set of two (2) ribs are spaced 6" apart, the the next two (2) are placed 17" apart from the first group. Fastening and positioning these ribs so they are spaced and parallel is done by four (4) 32" stainless threaded rods and washers and nuts that hold everything square.

In addition; there are four (4) ¾"×7.25" stainless steel grooved rods that are mounted at the top outermost end of each set of two (2) ribs. These are the Canopy Torque Rods that the Arm Assembly hooks will grab and pull down on. On the inside profile of each ribs, there are two (2) radial slots ¾" wide and 7" long. These are known as raceways. Milled nylon rollers are inserted into these raceways to carry a "shuttling" mechanism that has independent "feet" that traverse outward and downward in an arc; and terminate upon contact with the inward facing side of the gunwale of the canoe. These Canopy Shoe Assemblies are spring loaded to ensure positive contact and pressure against the canoe. These Canopy Shoe Assemblies retract inwards when not in use.

A fulcrum mechanism with two (2) opposing handles is installed to apply symmetrical linear pressure to these four (4) groups of nylon slides and feet via rods and rod ends to increase outward pressure until the mechanism over-centers;

then the handles can be stowed in a locked position, which results in a pinch force against the inward sides of the canoe; therefore preventing movement or removal. This assembly ends up being the actual point of contact for the Hook as opposed to actually grabbing the canoe, and it also acts symbiotically with the arm to control lateral and vertical spread of the canoe's structure under such forces.

Mounted in the center of the Canopy Assembly is the Canopy Flotation Pad, which is a block of closed cell foam 4½" tall×16.75 deep and 20" wide in a 43 degree radius. This Flotation Pad slides onto all 6 Canopy Cross Rods and is trapped in place by these rods and the associated nuts and washers. This Canopy Flotation Pad is then coated with a thick layer of a moisture barrier of poly urea, making it impenetrable to the elements. Because it is constructed of closed cell foam and coated, this addition to the Canopy Assembly assures that the unit will never sink if accidentally released into the water.

Below these major assemblies, there are 6 Sub-Assemblies:

Tower Assembly:

This consists of twelve (10) equal length ⅝" stainless steel threaded tubes and two (2) of the same tubes but slightly shorter) rising vertically from mounting points on the lower level of the Gantry Assembly and up through the Gantry Top Platform Sheet to a height of approximately 24" above the Gantry Assembly's top surface. This is done for stability; since it cancels out the vertical wagging that would occur if the mounting points were on the Gantry Top Platform Sheet. These tubes are grouped in quadrants each containing three (3) tubes arranged in a triangle placement. Each quadrant controls one (1) Return Asset Arm above it on the Powerhead Assembly. On the top of each of these tubes, a ⅝" threaded ball end rod connector will be attached.

Of the three (3), the two (2) innermost rod ends are in opposition, and the outermost one (1) is perpendicular to the group. There is a mirror image on the other end of the assembly. A ⅝" SS grooved rod spans between the two (2) opposing rod ends, and a milled SS Bridge runs perpendicularly from this rod towards and into the perpendicular rod end. Each quadrant works independently from the other as they are driven under extreme pressure to follow a common pressure point from below; and therefore act collectively. Equal pressure is applied to each quadrant. These four (4) quadrants are divided up into two (2) banks, right and left. Each bank is symmetrical to the other; they are not connected in any way. They work in opposition; but each side must be pulled against the other with equal pressure to force the Main Spring back down again.

Gas Spring Group:

This consists of nine (9) nitrogen charged gas springs arranged geometrically to provide hydraulically balanced vertical support for the unit and it's load; providing the reactionary force to close the arms securely against the hull, apply extreme linear force against the Elevator Assembly which then translates that force to the "Return Asset" assembly, which then aggressively pulls the hull towards itself; while doing no harm to the canoe whatsoever. These gas springs are manufactured from stainless steel to provide longevity and high strength.

The center gas spring is known as the Main Spring. It is the most powerful spring in the device. The Main Spring's primary objective is to compress the arms closed and supply extreme upward pressure to the return asset feature (discussed in detail further in this brief) as to compress the hull downward against the roller assembly. This spring drives 270-300 ft lbs. against the Elevator Assembly upwards against the bottom shoulders of the above mounted Powerhead Assembly and (most importantly) up against the undersides of all four Arm Cams. This is the point of contact for power conveyance. The Main Spring is the only spring among the 5 that is firmly connected to both the Elevator and the Gantry Assemblies. The other 4 auxiliary (compression) springs have rod end mounts that swivel and track in slots in the Powerhead Assembly to allow extremely controlled vertical and diagonal movement. The four (4) auxiliary springs are rated at 90 ft. lbs. each and are positioned at a 75 degree angle from outside to inside. These springs are approximately 1.5" in diameter and have a full extension of 15" relative to the Gantry. Angled outward to inward toward the upper center, these springs serve dual purpose. Firstly; they apply equal pressure on both sides of the vehicle as to provide a default balance in support, keeping the canoe level. They do this by being interconnected with the Scissors Assembly which only permits equal and opposite movement of each opposing spring.

Secondly; the Spring/Scissors relationship allows vertical dampening of the weight of the canoe and automatically changes the camber of the support as the momentum increases and decreases while the canoe is transported up and down terrain. In essence; the canoe is locked down to the upper platform yet is permitted to "bob" up and down as the terrain demands. As the upper platform moves downwards, the Compression Springs give in and contract, but they are attached to the upper ends of the Scissors Assembly, and so they move from 75 degrees to 90 degrees, providing direct perpendicular support underneath the load.

Conversely; as the terrain levels out, the compression springs regain their powerful advantage and begin to extend upwards, but are dictated to by the Scissors Assembly; and the resultant movement is again from 90 degrees down towards 75 degrees, which is considered the "default" position. In contrast, the Compression Springs' initial purpose is to assist the Main Spring in achieving upward motion until contact with the Powerhead Assembly; but then they take on a secondary role, that being lateral stability of the load and to act as a suspension system for the upper carriage against the lower one, providing upward and downward deflection to dampen the effect of the differing terrain encountered on the beach.

Belt Assembly:

This consists of a 12" wide ⅛" thick (60 durometer) neoprene belt approximately 60" in length wrapped around three 2" rollers and positioned directly underneath the canoe's hull. This belt is tension taut by the Belt Tensioning Assembly to provide resistance to keep the belt tight until the canoe offers force enough to close the distance between the two top rollers and then assumes the exact profile of the canoe's hull; finally stopping as the rollers and belt rest against the bottom portion of the hull and forms a cradle and then allows the belt to stretch slightly until the forces at play come to equilibrium. This completely envelops the hull and arrests any further movement.

Belt Tensioning Assembly:

This consists of four (4) gas tension springs mounted at diagonally opposing angles to the Belt Assembly. Two of these are mounted on each side of the upper assembly and are attached to the ends of each of the two upper rollers. These springs pull away from center thereby keeping a constant reverse pressure on the belt, keeping it tight and stable. As the weight of the canoe settles onto the top surface of the belt, these springs extend as their force is overpowered by the downward pressure of the canoe and the arms.

This creates slackness in the belt, allowing it to depress and envelope the exact profile of the hull pressing down upon it from above. The tensioning springs expand with this deflection until the rollers and belt bump up against the hull; where they stop and create an immovable, yet soft barrier. At this point, the springs offer no further assistance other than maintaining the rollers inline and oriented the correct way. The lower roller; however, has adjustment screws embedded within the structure with locknuts for easy turning to adjust the tension from the bottom end. This adjustment ends up being exponential in pressure in relation to the belt.

Arm Assembly:

This consists of four (4) specially shaped features that are designed to capture the canoe Constructed of 1 central layer of 1" thickness flanked by 2¼" cover sheets of ¼" thickness. Material would be suitable in many materials, but plastic or acetal would be best. The Arm Assembly stands 32.5" tall and is the mechanism responsible for grappling the Canopy Assembly and hence the canoe and pulling it towards the center of the Tuck into the neoprene belt. The arms rotate in the perpendicular plane to the Truck's centerline. The Arm is hollow in it's center with the exception of the Arm Spine, which is 1.35" thick an designed to a particular radius and curvature as to create a "Cam" on the back of the Arm Spine. This curvature and surface is responsible for forcing the Elevator Assembly back down or up from fully open to fully closed. The back of this Spine interacts with the Elevator Pressure Roller. The Arm rotates on the ⅝" Tower Cross Rod Assembly of the Tower Assembly. The Return Asset Cam also resides within his Arm and shares the same ⅝" Tower Cross Rod Assembly rotational axis. The Return Asset Cam turns in the opposite direction as the Arm. Attached to the Return Asset Cam is a cable that runs around 2 pulleys on it's way up to the Hook Assembly at the top of the Arm. As the Return Asset Cam rotates counterclockwise to the Arm's clockwise, the cable gets pulled down and pulls against the Hook. The Hook is limited to up and down movement only by stainless steel pins and friction knobs and shafts to control desired slippage. It is given slots to move 5 inches vertical only. There is a Hook Return Spring and a stop block attached within the Arm Assembly to return the Hook to it's full open position. This action is what drives the Hook assembly to come downwards and lock against the Canopy Assembly and the ability for the unit to overlock the canoe.

At the bottom of the Arm, the surface is flat relative to the horizon and parallel to the top surface of the Powerhead Top Sheet At the top of these Arms, movable hooks rest inside a machined clevis to contain and guide the hooks. It is these hooks that actually grab the hull and force it downwards, as they are connected directly to the Return Asset Cams. Halfway up the outside of the Arm, handholds are milled into the structure as a point of pushing/pulling the unit and also to spread apart the arms when wanting to disengage the hull from the unit.

Return Asset Assembly:

This technology is the #1 most important feature of the RC-D2 and is the crux of it's operation. The Return Asset Assembly is intertwined with the Arm Assembly and consists of four (4) circular wheels or cams. These cams are manufactured from ⅝" acetal sheet and are approximately 6" in diameter, mounted in the same plane and line direction as the arms and their associated eccentric cams. They are relief cut for strength and rigidity. Each is mounted either in front of or behind their associated arm. Each bank mirrors the other. On the face of each of these cams, there are two (2) ⅜" holes. One of these is positioned very near the outer edge of the disk plane; the other is very near the axis and the support shaft. They rotate on the drive shaft as do the arms, but are "semi" independent to move on their own. This is accomplished by milling 3 additional slotted holes into the cam to allow 3 bushed bolts (attached to the outside face of each Arm) to travel a certain distance in a rotational trajectory without moving the cam. The cam's purpose is to counter rotate against the Arm's rotation in order to activate a cable that pulls down through a cavity within the Arm's body and is attached to the hook; which then pulls down on this hook as the cam's rotation inwards increases, This in turn drives the canoe deeper and deeper into the belt. The cams are driven by a push rod that is attached to the Elevator Assembly and are arrested only by manual input to the overlock levers.

This is designed to allow the arms to be reefed over to the down and locked position without having to take the Return Asset cams with them. The slots only go in one direction; so when the the arms are up and just about to begin the downloading, the bushed bolts hit up against the wall of the slots and torsion begins. This provides a means of timing the movement of the Return Asset cams with the Arms. Attached to each of the 2 holes in each cam are two (2) ½" stainless steel push rods. One short rod (5.5 to 6" tall) points downwards and is adjustable through the use of a stainless steel turnbuckle to a special "pad" at it's bottom end. This pad will rest against and be pushed up aggressively when the device has been actuated. The other end of this rod is attached to the inner hole on the cam. The rod is deliberately bent with a curved 2" radius at the top near the joint of the inner hole mounting pin. This provides for overlock of the cam.

Another ½" SS rod is attached to the outer hole on the cam, and this rod extends upward (bending slightly in 2 places to align it directly in plane and underneath the hook and arm assemblies). This rod is adjustable in the same fashion as the previous. The upper end of this rod is attached with a rod end to the hook assembly on each arm with a bushed bolt and clevis. The hook is spring loaded internally to return to the upward position when not under any load (which also returns the RA cams to their respective home positions when not under any load). The hook is allowed to travel up and down in a machined clevis built into each arm's upper end, but not side to side or at any other angle. This hook is made of acetal as well.

Racing Canoe Dolly is designed to be operated as a pair. Specifically; there are two (2) distinct units:

Main Truck: This unit has all the features mentioned above. This unit is designed however; to be the primary carrier of the weight of the canoe (450 lbs.) This unit (Main truck) would be responsible for supporting 65% of the full weight, or 300 lbs. It is, therefore, equipped with some unique properties: This truck has additional twin coil-over springs mounted within the Gantry deck that are attached to and rotate two (2) Coil-over Levers that work against the Suspension Arms; which support the entire vehicle. These twin coil-overs act independently from one another. Although they share a common mounting point, they work on separate axle shafts. Their job is to counteract the weight of the apparatus above and the canoe itself with opposite and equal force, providing suspension to keep the device upright and level while in motion.

Front Truck: This unit is similar in shape, size and scope of the Main truck; but only required to carry 35% of the load (150 lbs). This is engineered differently as to provide buoyancy for the front end of the canoe to shift the CG (Center of Gravity) towards the appropriate position as to transit the beach without binding or porpoising, and to provide steering capability. The front truck has identical mechanisms as the Main truck except for the undercarriage features. This unit has a tandem set of smaller sand tires at close proximity with an axle underneath the bottom. They are trailing casters and as such are cantilevered away (rearward) from the center line to provide steering capability. A center line detent is being considered to keep it tracking in a forward position unless deviated. This nosewheel Assembly How this device works:

Closing Operation:

As a preface, it is important to note that the canoe that this device is designed for is manned by 6 persons. Each truck must be manned by two people. No single individual can operate either truck. It must always be done in tandem. Also important to note is that the Canopy Assemblies on each Truck are placed and latched onto the canoe before operation in a separate motion and ahead of time.

This mechanism operates in the same fashion as a set of locking jaw pliers. The Main Spring (which is attached to the Main Spine Assembly and the Gantry Assembly at the bottom end and attached to the Elevator Assembly at the top end) exerts an upwards force against the Elevator; forcing the Elevator upwards against the Powerhead Platform Sheet. This Platform Sheet has 4 square pass-through holes routed into it that allow the Elevator Drive Pads (part of the Elevator Assembly) to advance through the Powerhead Platform Sheet and up against the undersides of each of the 4 Arm Assemblies mounted above. These Arm Assemblies rotate about a horizontal component of the Tower Assembly (which is directly attached to the Gantry Assembly below) and therefore limit their vertical travel and their rotational travel to one plane only. This association provides an anchor point and a point of rotation for the Arms. The Arms have a uniquely shaped slope on their back frames to provide a contour that applies increasing pressure and vertex/pressure distance the more it's rotated, and conversely, as the Main Spring applies it's upward pressure; the Arms have no option but to rotate and automatically find the shortest distance between the point of pressure and the point of rotation. This results in the Arms closing in towards the canoe and coming to a stop at a point that is close to but yet not touching the outer sides of the canoe.

As these Arms are closing; within an adjustable degree of rotation, the Hook Assembly (mounted within the Arm Assembly) begins a downward transition towards the Canopy. It does so by way of a cable connecting the Hook to the Return Asset Cam on the lower side of the Arm. This Return Asset Cam counter-rotates to the direction of the of the Arm, The Return Asset Cam shares the same rotational shaft as the Arm. The Return Asset Cam also has a push rod assembly that directly connects it to the Elevator Assembly. This is called the Candy Cane Assembly because of it's profile.

With the exception of the Canopy Assembly and the Rubber Belt, the mechanism never touches the canoe. Every motion and action of the device takes advantage of the linear strength of the canoe walls and the resistance of a durable rubber belt. The device closes in and surrounds the profile of the canoe, contacts and engages with the Canopy Assembly, and apples increasing downward pressure on all sides of the canoe until the belt reaches equilibrium, which is achieved by the relationship between all the directional forces applied against the physical geometry of the canoe and the resistance of the rubber belt. At this point, human intervention will be needed to flip over the ringed handles to activate the "locking pliers" effect. This secures the canoe from any movement or sway and prevents unwanted unloading or release of the pressure applied to the canoe. Human intervention will again be required to undo the process in the reverse manner. The machine cannot accomplish this by itself. This is added as a safety feature.

Power is supplied to the units by 5 gas springs: One (1) large centrally located Main Spring provides the pressure necessary to force the Arms closed and the Hook Assembly down via the Arm Cams. The four (4) Compression Springs between the Powerhead Assembly and the Gantry Assembly are diagonally spaced from the outside in and share an attached union to the Scissors Assembly. The purpose of these compression springs is to always keep parallel relationship between the Gantry Assembly and the Powerhead Assembly regardless of weight.

Opening Operation

Working in reverse, (2) two persons face each other at the truck and rotate all 4 of the overlock levers to release the machine's grip. They then grab a hold of either both Arms close to them or they grab the Unilever Handle which connect both of them. Stepping up with one foot onto the Gantry Platform Sheet and then leaning outwards simultaneously with each other, two people are able to move the Arms outwards and down. This action causes the Arms to rotate against the Elevator Drive Pads and begin moving the Elevator Assembly back down again which is also compressing the Main Spring. This rotates the Arms away from the canoe and outwards towards the Powerhead Platform Sheet.

There are small rectangular cutouts in the Powerhead Platform Sheet that will accept an appendage of the Arm Assembly called the Arm Latch to protrude through the Sheet and engage in 4 (four) Arm Release Trigger Assemblies that are attached to the underside of the Powerhead Platform Sheet and locks the Arms in the downward position. These latches are released by pulling on any one of the 4 Trigger Lever Assemblies which are connected to each other by cables to 3 centrally located Bell-Crank Assemblies on the underside of the Powerhead Assembly and the 2 push rods between them to activate all 4. Arms simultaneously. Rotating the Arms This is how the device would be towed down to the surf and submerged into the water until triggered again, releasing the Arms and starting the process over. The canoe can be lifted off of the Rubber Belt and transferred to to another berth, or released into the water to be pushed away. In this position, it can also be used as a moored docking pedestal by anchoring the entire Canoe Dolly Assembly into the beach head with 4 diagonal guy ropes and screw anchors. in anticipation of an upcoming race.

I claim:

1. A canoe transport dolly comprising:
   a) a main truck;
   b) a front truck; and
   c) a rod connecting the main truck to the front truck, the main truck and the front truck each comprising:
      i) a gantry assembly comprising one or more tires;
      ii) an elevator assembly connected to an upper portion of the gantry assembly;
      iii) a main spring assembly connected to the gantry assembly and the elevator assembly, wherein the main spring assembly exerts upward pressure on the elevator assembly, iv) a powerhead assembly movably engaged with an upper portion of the gantry assembly, the powerhead assembly comprising:
  (1) a platform, wherein the elevator assembly passes through the platform; and
  (2) a belt assembly comprising a belt wrapped around a series of rollers for receiving a canoe hull, wherein the belt assembly is positioned above, and connected to, the platform;
v) a plurality of arms in rotational communication with the powerhead assembly, each arm having a hooked end extending away from the powerhead assembly;
vi) a canopy assembly positioned above the belt assembly for engaging a canoe gunwale, wherein the arms' hooked ends releasably engage the canopy assembly; and
vii) a return asset assembly in communication with the arm assembly and the elevator assembly, the return asset assembly comprising:
  (1) a plurality of cams, each cam corresponding to one of the plurality of arms; and
  (2) a plurality of cables, wherein a first end of each cable connects to a corresponding cam, and wherein a second end of each cable connects to the hooked end of the corresponding arm, wherein rotation of each cam creates a downward force on the corresponding cable, causing the corresponding arm's hooked end to move downward against the canopy assembly, driving a canoe into the belt.

2. The canoe transport dolly of claim 1, wherein the main truck further comprises:
  a) a right-side suspension assembly; and
  b) a left-side suspension assembly, the right-side suspension assembly and the left-side suspension assembly each comprising:
    i) a suspension arm having a first end connected to a forward axle half shaft of the gantry assembly, and a second end comprising a suspension axle half shaft connected to the one or more tires;
    ii) an axle torsion lever; and
    iii) a coil-over spring, wherein the coil-over spring is in communication with a first end of a rearward axle half shaft of the gantry assembly, and wherein a first end of the axle torsion lever is connected to a second end of the rearward axle half shaft, wherein a second end of the axle torsion lever slidingly engages a groove within a corresponding suspension arm to activate the coil-over spring.

3. The canoe transport dolly of claim 2, wherein the front truck gantry assembly comprises a single axle having a set of tires positioned underneath the front truck gantry assembly, wherein the front truck is steerable.

4. The canoe transport dolly of claim 1, wherein the front truck and the main truck each further comprise a compression spring assembly comprising four auxiliary springs, each having a first end connected to the gantry assembly and a second end that slidingly engages a corresponding slot in the powerhead assembly.

5. The canoe transport dolly of claim 1, wherein the front truck and the main truck each further comprise:
  a) a right-side tension spring assembly having a first end mounted on a right side of the platform and a second end attached to an upper right-hand roller of the belt assembly; and
  b) a left-side tension spring assembly having a first end mounted on a left side of the platform and a second end attached to an upper left-hand roller of the belt assembly, wherein the right-side tension spring assembly and the left-side tension spring assembly pull the belt away from a center of the platform.

6. The canoe transport dolly of claim 5, wherein the right-side tension spring assembly and the left-side tension spring assembly each comprise two tensioning springs, wherein the tensioning springs of the right-side tension spring assembly and the tensioning springs of the left-side tension spring assembly are mounted at diagonally opposing angles to a respective side of the belt assembly.

7. The canoe transport dolly of claim 1, wherein the gantry assembly of each of the front truck and the main truck comprises an upper level and a lower level, wherein a tower rod assembly comprising a plurality of threaded tubes is connected to the lower level and passes through the upper level and the platform.

* * * * *